US007528571B2

(12) United States Patent
Kernahan et al.

(10) Patent No.: US 7,528,571 B2
(45) Date of Patent: May 5, 2009

(54) METHOD FOR CHARGING A BATTERY USING A CONSTANT CURRENT ADAPTED TO PROVIDE A CONSTANT RATE OF CHANGE OF OPEN CIRCUIT BATTERY VOLTAGE

(75) Inventors: Kent Kernahan, Cupertino, CA (US); Milton D. Ribelro, Los Altos, CA (US); Dongsheng Zhou, San Jose, CA (US); Larry A. Klein, Sunnyvale, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 11/688,876

(22) Filed: Mar. 21, 2007

(65) Prior Publication Data

US 2008/0191666 A1    Aug. 14, 2008

Related U.S. Application Data

(63) Continuation of application No. 11/705,947, filed on Feb. 12, 2007, now abandoned.

(51) Int. Cl.
    *H01M 10/44*    (2006.01)
(52) U.S. Cl. .................................... 320/107
(58) Field of Classification Search ................ 320/107, 320/129, 132, 162
    See application file for complete search history.

(56) References Cited

U.S. PATENT DOCUMENTS 4,564,798 A * 1/1986 Young ........................ 320/103
5,686,815 A * 11/1997 Reipur et al. ............... 320/116
2002/0119364 A1   8/2002 Bushong
2003/0206021 A1 * 11/2003 Laletin et al. ............... 324/426
2004/0222769 A1  11/2004 Al-Anbuky

* cited by examiner

*Primary Examiner*—Edward Tso
(74) *Attorney, Agent, or Firm*—Michael W. Caldwell

(57) ABSTRACT

A method for charging a battery is disclosed, wherein a constant current charging current is periodically adjusted as needed such that the change in battery voltage increases approximately linearly during the charging period. In some embodiments the charging is in three phases. An optional first phase charges with a low current until the battery voltages rises to a certain minimum. During a second phase a constant current is provided while the battery voltage is monitored. The second phase constant current is periodically increased if the rate of change of battery voltage is less than a predetermined value and is decreased if the rate of change of battery voltage is more than the predetermined value. When the battery voltage attains a predetermined value, a third phase begins wherein a constant voltage is applied to the battery while the battery current draw is periodically monitored. Charging is stopped when the battery current draw falls to a predetermined value or, in some embodiments, when the charging current drops to a value that is a certain percentage of the charging current at the termination of phase two.

In one embodiment the battery voltage is monitored to determine a possible battery failure, for example in the case of the battery voltage decreasing during the constant current charging of phase two. In some embodiments the battery is shorted out in response to detection of a possible failure.

19 Claims, 15 Drawing Sheets

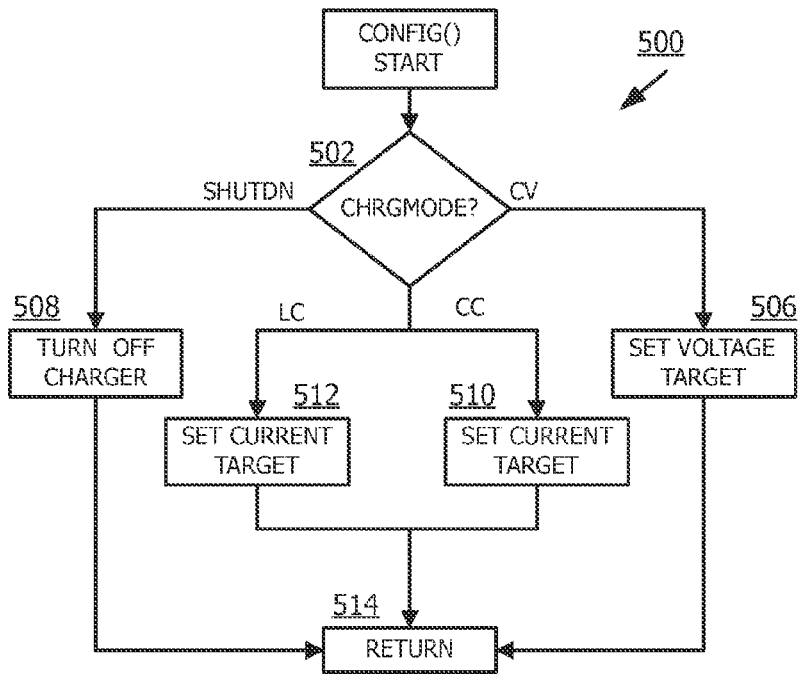
FIG. 5
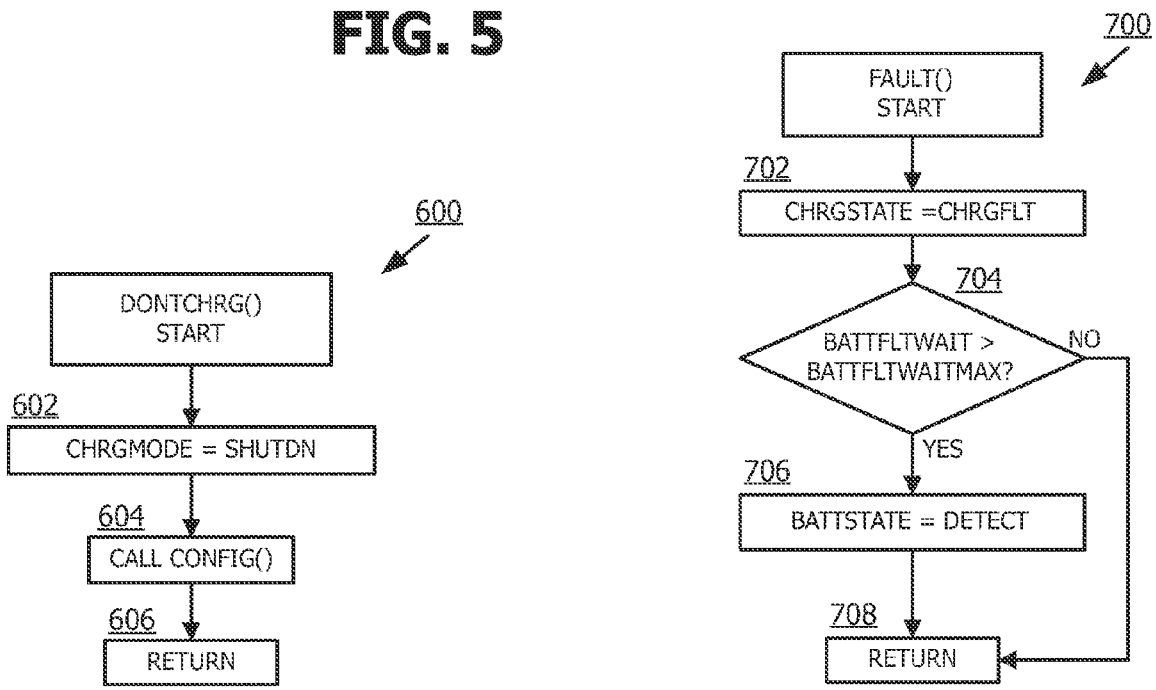
FIG. 6
FIG. 7

METHOD FOR CHARGING A BATTERY USING A CONSTANT CURRENT ADAPTED TO PROVIDE A CONSTANT RATE OF CHANGE OF OPEN CIRCUIT BATTERY VOLTAGE

CROSS REFERENCE TO RELATED APPLICATIONS

This application claims priority of and is a continuation of the commonly assigned U.S. patent application Ser. No. 11/705,947 filed Feb. 12, 2007 via Express Mail, tracking number ED354979677US, by Kent Kernahan, Milton D. Ribeiro, Dongsheng Zhou, and Larry A. Klein, entitled "METHOD FOR CHARGING A BATTERY USING A CONSTANT CURRENT ADAPTED TO PROVIDE A CONSTANT RATE OF CHANGE OF OPEN CIRCUIT BATTERY VOLTAGE", which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

As consumer electronics products are more and more powered by rechargeable batteries it is important to provide means for recharging the batteries. Rechargeable batteries offer lower lifetime cost to the consumer. Also, rechargeable batteries may allow the design of a product enclosure that does not require means for easy access to a battery for replacement. Batteries which do not require replacement may also allow the manufacturer to utilize a custom, nonstandard battery form factor which in turn may allow for a smaller or more ergonomic end product.

Rechargeable batteries typically involve a chemical process which delivers current when the positive and negative terminals are connected across a load, the process being reversible (charging) by the application of a voltage sufficient to cause a net current to flow into the battery. The charging process, then, provides electrical energy which is stored and later may be released. The predominant chemistries used today are those using some form of lithium, nickel, cadmium, or lead, though many other chemistries are also used.

Batteries based upon a lithium-ion (Li-ion) chemical reaction are used in many products. Li-ion battery manufacturers specify the charging method and various parameters for charging a battery. The predominant method specified is for a charger to charge a Li-ion battery using a constant current until a certain voltage is attained (for example, 4.2 volts), then to provide a constant voltage for an additional period of time until the charging current goes down to a certain level, which is defined as the end-point condition. This method is denominated the "CC/CV" or "Constant Current/Constant Voltage" method. In a standard CC/CV charging profile, measurements of battery voltage are only used to determine when to switch from constant current charging to constant voltage charging, after which charging current is monitored for end-point determination.

Multiple charge/discharge cycles slowly erode the battery electrodes, decreasing a battery's electrode surface area. Thus, as a battery ages, the current density resulting from charging at a specified constant current increases, more rapidly degrading the performance and lifetime of the battery. There is variation from battery to battery of a common type due to manufacturing variations. Even a given battery will have more power available (and be capable of accepting a more aggressive charging profile) when fresh, undamaged, and warm. Likewise the same given battery will have less power available (and require a correspondingly less aggressive charging profile) after many charge/discharge cycles, when damaged, or when cold. Thus the CC/CV charging method may undercharge or take longer than necessary for some specific battery units, or may overcharge or charge too rapidly for other units, thus causing them damage which shortens battery lifetime as well as giving the user a less satisfactory experience. The industry, then, has need for a charging solution that adjusts to the actual instant condition of a battery such that any given charging cycle is as short as possible but without damage and avoiding undue deterioration of the performance of the battery.

SUMMARY

This section summarizes some features of the invention. Other features are described in the subsequent sections.

In one embodiment of the present invention the method comprises three phases for charging a battery from a fully-discharged state. In a first phase a battery is charged with a small constant current until the battery voltage attains a certain minimum value. During a second phase the open circuit voltage of the battery is periodically measured and a constant current value is modified to provide for a predetermined, constant rate of change of open circuit battery voltage. Thus during the second phase the battery itself provides feedback to the charging system as to the battery's ability to accept charge. When the battery voltage attains another certain minimum voltage a third phase begins. During the third phase the charging system provides a constant voltage and monitors the slowly decreasing battery charging current to determine when to stop charging. This three-phase method is termed the "CR/CV" or "Constant Rate/Constant Voltage" method. The method of the present invention is similar to the CC/CV method, however in the present invention the constant current of the second phase is determined for each charging cycle and throughout the charging period, thus adapting to aging, damage, end environmental factors such as temperature. In contrast, the CC/CV method provides a constant current that is predetermined.

Factors such as age, electrode area and temperature will be reflected in the current required to provide the predetermined rate of change of voltage. For example, as an individual battery unit ages and the electrodes lose some amount of surface area, less charging current is required to cause the predetermined rate of change of open circuit battery voltage. Said differently, as a battery gets older it is able to accept charge at a lesser rate. The open circuit voltage increasing at the predetermined rate but with a lesser amount of current does not imply an older battery is more efficient. The reverse is true; the older battery will attain the maximum open circuit voltage with less total charge (the product of current and time) having been supplied, thus less energy stored for discharge through the load.

BRIEF DESCRIPTION OF THE DRAWINGS

FIG. 4 through FIG. 12 are example flow charts of some embodiments of the present invention.

FIG. 4 is an example flow chart wherein the state of a charging system is determined, then control passed as a function of the charging state.

FIG. 5 is an example flow chart of a subroutine wherein requested changes are made.

FIG. 6 is an example flow chart wherein a charging system is shut down.

FIG. 7 is an example flow chart for response to a detected fault condition.

FIG. 8 is an example flow chart wherein the instant parameters of a battery and environmental conditions are considered in determining an action to be taken.

FIG. 9 is an example flow chart wherein for controlling charging during a low current mode.

FIG. 10 is an example flow chart for controlling charging in a constant current mode, wherein the target constant current made be changed.

FIG. 11 is an example flow chart for controlling charging in a constant voltage mode, wherein an end point condition is also monitored.

FIG. 12 is an example flow chart wherein a charging system is configured for a mode wherein a battery is available for use.

DESCRIPTION OF SOME EMBODIMENTS

The embodiments described in this section illustrate but do not limit the invention. The invention is not limited to any particular circuitry, software, voltage, current values, battery chemistry, time, or other parameters.

The unit "CmA" refers to the current flow per hour into or out of a battery, as a fraction of the battery's rated capacity. For example, if the rated capacity of a battery were 2000 milliampere hours, then 0.1 CmA would be a current flow of 200 milliamperes. The rated capacity of a battery stated by its manufacturer is typically used in specifying charge rate, though in actual practice the capacity of a given battery may vary.

In the description to follow several timers are referred to. As one skilled in the art would know, timing may be implemented in a variety of ways. Examples include a software counter whose value is occasionally increased or decreased; a hardware timer whose value may be read and compared to an earlier value; up or down counter; a timer with a vectorable interrupt service routine, and others. For simplicity of description only one such timer will be described. Hereinafter all timers will be considered to be internal to the control logic unit 204, implemented as a software counter. For instances wherein a time out condition is tested, the counter is initialized with an appropriate maximum value and the value of the counter is decremented before the step for testing for the time out condition. For instances wherein a timer maximum value is to be tested, the counter is initialized by setting the counter to zero and the value of the counter is incremented before a step in which the counter value is compared to a maximum count. For instances wherein an elapsed time is needed there is assumed to be a resettable timer which is clocked by a time base of a known period; the timer is reset, then its value read when needed.

Figure 1:
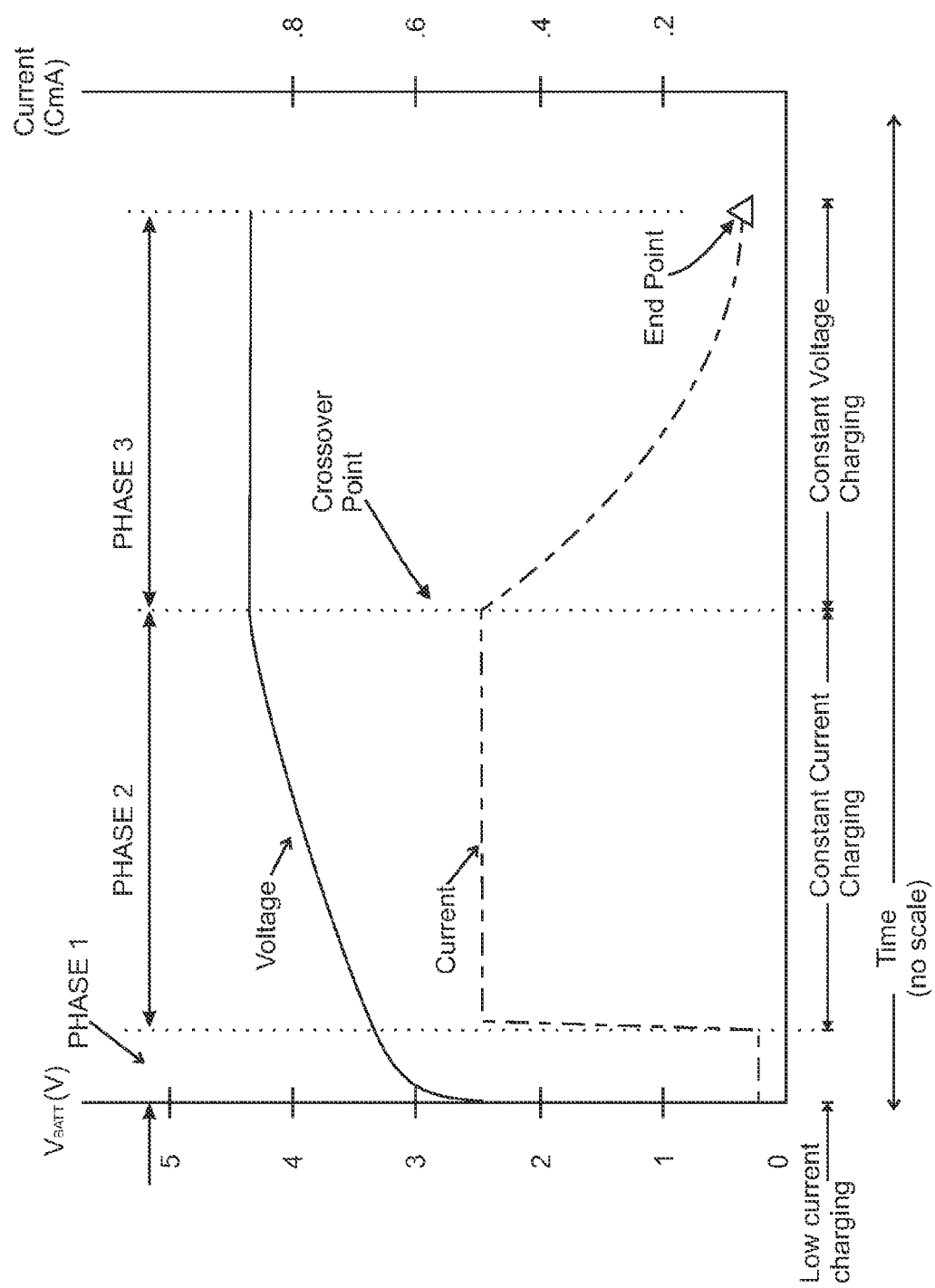
FIG. 1 is an example of a typical CC/CV charging profile used in the relevant art. PRIOR ART.

Referring to FIG. 1, an example of a typical charging method charges a Li-ion battery using a low current (Phase 1) until a minimum voltage is attained, then charges at a constant 0.5 CmA (constant current charging, Phase 2) until a battery voltage of approximately 4.2 volts is measured, noted on FIG. 1 as the "crossover point". Thereafter the applied voltage is held at a fixed 4.2 volts (constant voltage charging, Phase 3) while the current through the battery is measured. When the battery charging current has diminished to approximately 0.1 CmA (with the impressed voltage of 4.2 volts), the battery is deemed fully charged and charging stops.

Figure 2:
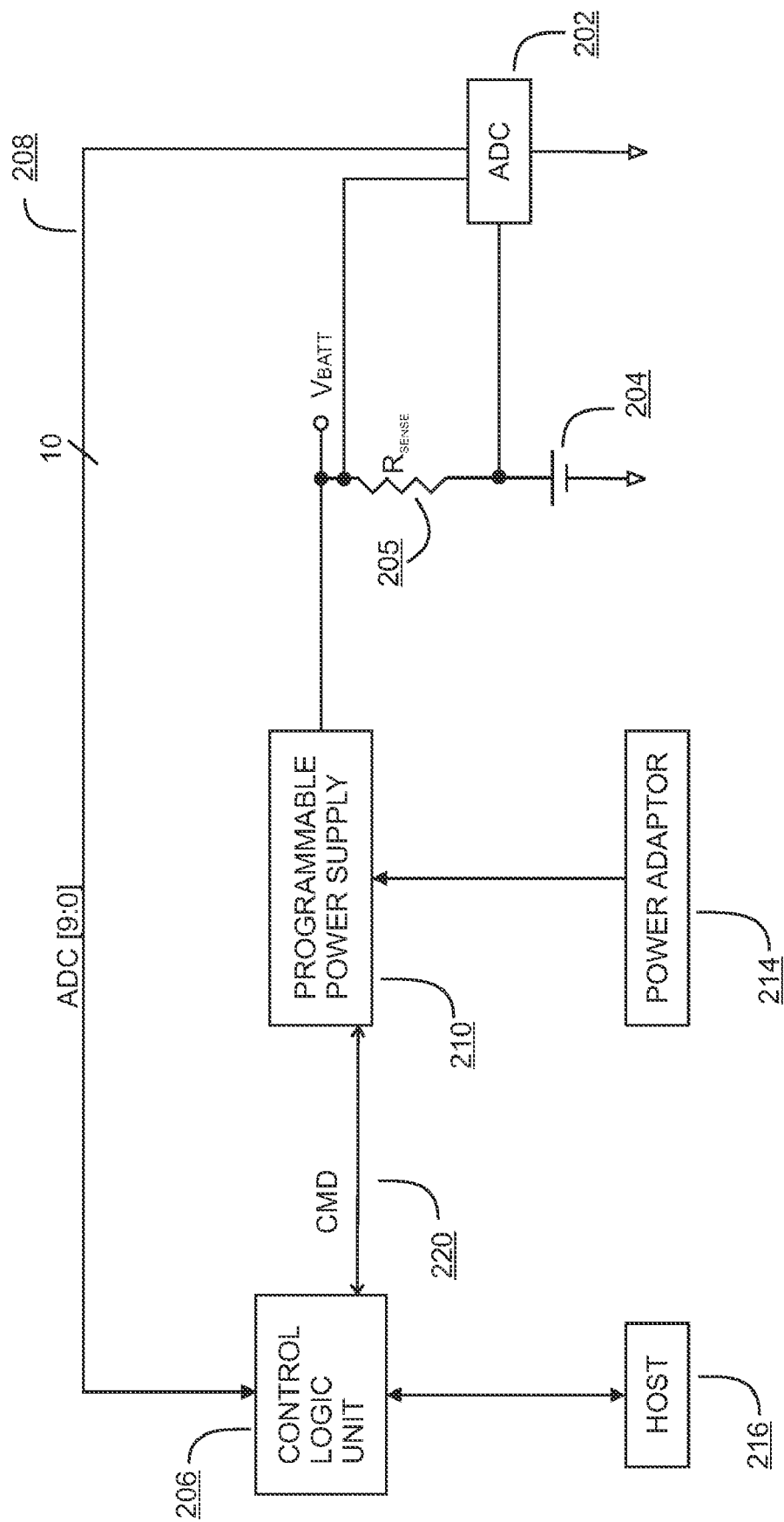
FIG. 2 is an example of a system which may be used to practice the invention.

Referring to FIG. 2, an example is shown of a system which may be used to practice the method of the present invention. In this example there is no load during battery charging other than the battery itself. Thus, when the programmable power supply 210 is shut down, the battery 204 voltage ("$V_{BATT}$") is the battery open circuit voltage "Voc". When the programmable power supply 210 is operating and charging the battery 204, $V_{BATT}$ is the battery voltage. In some embodiments the output of the programmable power supply 210 is interrupted by a switch (not shown) controllable by the control logic unit 206, for example a transistor or electromechanical switch or other means for disconnecting battery 204 from the programmable power supply 210, to enable measuring the open circuit voltage of the battery 204. In some embodiments battery 204 voltage is measured without removing the power supply 210, thus is not an open circuit voltage. An analog to digital converter (ADC) 202 provides a digital version of the instant voltage across the battery 204. The ADC 202 is connected to the control logic unit 206 by a bus 208. The bus 208 carries a digital representation of battery voltage ADC[9:0] from the ADC 202 to the control logic unit 206. In one embodiment the bus 208 is a parallel bus. In some embodiments bus 208 is a single line, the data ADC[9:0] then being provided to the control logic unit 206 serially. In one embodiment the ADC 202 is a ten-bit converter. An ADC with more or fewer bits of resolution may be used. Control logic unit 206 is comprised of logic, such as a programmed microprocessor or custom logic, which may implement the method of the invention by controlling the programmable power supply 210. The programmable power supply 210 may be configured to provide a selectable fixed current or a selectable fixed voltage as commanded by control logic unit 206. A power source, for example power adapter 214, provides input power which programmable power supply 210 modifies to provide to the battery 204 the voltage or current selected by the control logic unit 206. In some embodiments there is a line or lines for communication between the control logic unit 206 and the programmable power supply 210, for example line 220. Signals on the line 220 from the control logic unit 206 to the programmable power supply 210 may include commands for a certain voltage or current, a command to stop charging, requests for data, and the like. Signals on the line 220 from the programmable power supply 210 to the control logic unit 206 may include status, voltage or current values, failure notification, detection of a connection to a power source (for example power adapter 214), and such.

In some embodiments a host 216 communicates with the control logic unit 206. This provides for control logic unit 206 to provide voltage, current, mode, status or other information to the host 216 and/or to receive commands from the host 216. Examples of commands from the host 216 to the control logic unit 206 include commands to request status, and to initiate, continue, or discontinue charging the battery 204. In the description of the control logic to follow, the value of a variable "CHRGSTATE" is changed in response to conditions of the power supply. CHRGSTATE may then be passed to the host 216 by the control logic unit 206. The host 216 may use CHRGSTATE to make decisions external to the control logic unit 206. For example, the host 216 may take note of the number of times or of the elapsed time of a certain fault condition and decide to send a command to the control logic unit 206 to shut down charging altogether.

In some embodiments there are additional batteries to be charged (not shown) wherein programmable power supply 210 has multiple power output terminals or alternatively a single output terminal which can be connected to a selected battery. For embodiments wherein a plurality of batteries are available for charging, an ADC has multiple input channels or a MUX or other means to configure the ADC to measure $V_{BATT}$ for a specific battery being charged. In the disclosure that follows only one battery is described. The method of the invention can be practiced with each battery in the same fashion. The designer of a system practicing the present invention tailors the operation of the system per the specifications and characteristics provided by the battery manufacturer or other criteria. Some embodiments include means for sensing a battery sensor, for example a temperature sensor located on or near the battery, which sensor may provide temperature data by its temperature-responsive resistance. The sensor resistance may then be measured by ADC 202 and a temperature derived. In some embodiments the battery under charge includes an internal temperature sensor which provides serial temperature data to the control logic unit 206, or which has terminals for measuring the battery temperature sensor resistance.

As used in this disclosure the term "battery charger" refers to the elements shown in FIG. 2 except for the battery 204 and the optional host 214. "Battery charger" may also refer to programmable power supply 210 in some contexts.

Figure 3:
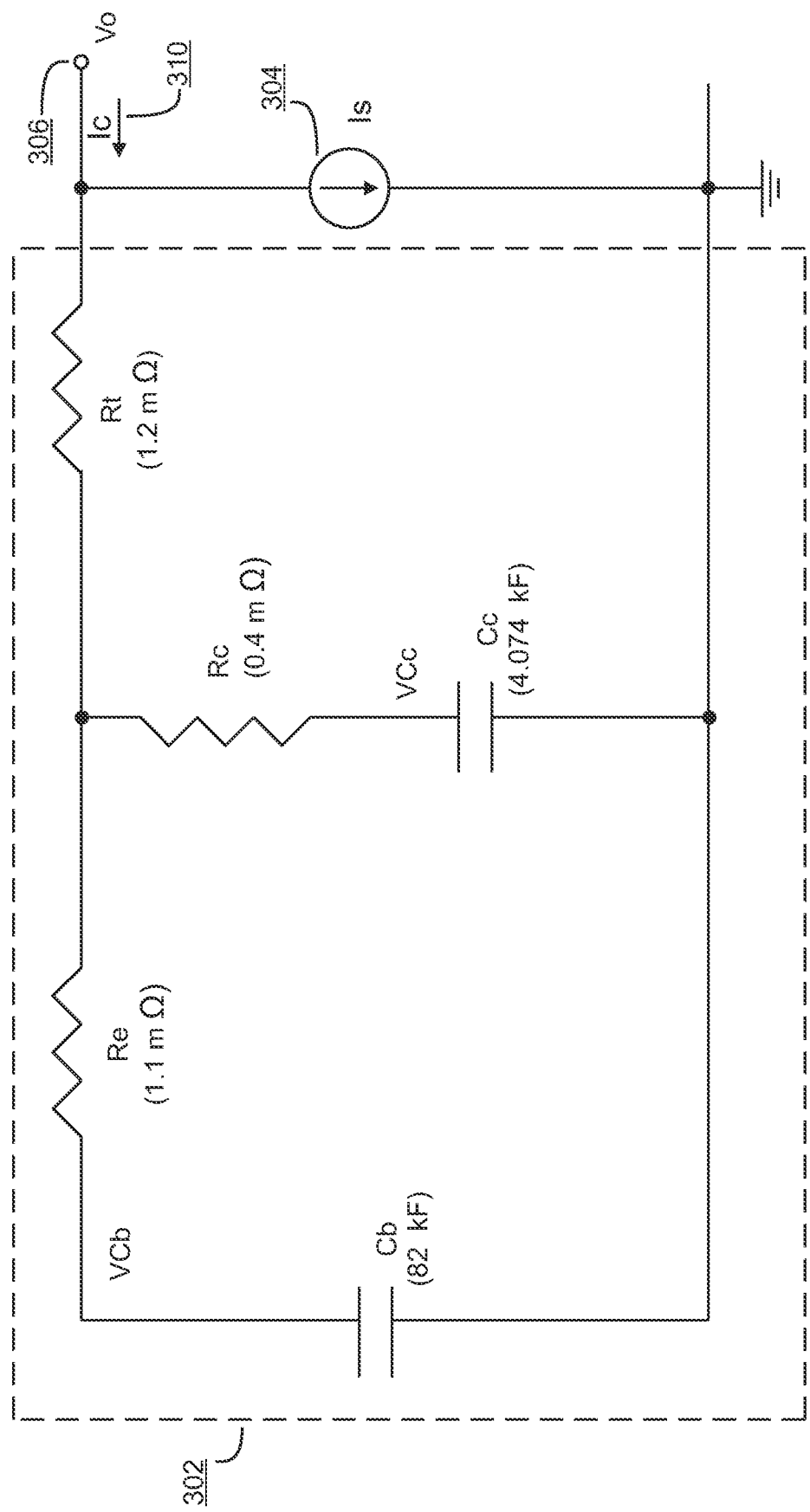
FIG. 3 is a model of a battery.

FIG. 3 is a model of a Li-ion battery, developed by the National Renewable Energy Laboratory (NREL) of the United States Department of Energy (DOE). A battery is represented by the circuit within the boundary indicated by reference number 302, and is comprised of two capacitors ($C_B$, $C_C$) and three resistors ($R_E$, $R_C$, and $R_T$). Total net charge into battery 302 is represented by Ic 310. Any load, $I_S$ 304, is viewed as simply another current request. The battery 302 is charged through the terminal $V_O$ 306. NREL has denominated this model the "Capacitance Model" or "RC Model". Upon inspection, we see that charging the battery 302 with a constant current charges the capacitors $C_B$ and $C_C$. The capacitors are a fixed value. The state of charge of the battery 302 may be known at any instant of time by measuring the open circuit voltage at the terminal Vo 306. The NREL conducted controlled experiments comparing the RC model to the known state of charge of representative batteries, and found the RC model to predict a final state of charge ("SOC") approximately 3.7% below actual.

The method of the present invention is illustrated by the flow charts of FIGS. 4 through 12. The tables below define various battery and charger states, battery and charger modes, and variables used in an example program used in some embodiments of the present invention.

TABLE 1

Battery States (BATTSTATE)

| SYMBOL | DESCRIPTION |
|---|---|
| CVCHRG | Constant voltage charging |
| CCCHRG | Constant current charging |
| FAULT | Fault detected |
| LO_CURR | Low current charging |
| DETECT | Detect state |
| DONTCHRG | Do not charge |
| USE | Battery is ready for use or is in use to power a load |

TABLE 2

Battery Errors (BATTERR)

| SYMBOL | DESCRIPTION |
|---|---|
| BATTDET | Battery error detected |
| BATTRTO | Low current charging time out |
| BATTCCTO | Constant current charging time out |
| BATTCVTO | Constant voltage charging time out |
| OVRTEMP | Battery is out of spec too hot or too cold |
| OCURRENT | Increasing battery current during constant voltage charging |

TABLE 3

Charger States (CHRGSTATE)

| SYMBOL | DESCRIPTION |
|---|---|
| CHRGFLT | Charger is experiencing a fault condition |
| CHRNG | Charger is charging |
| CHRGD | Battery is charged |

TABLE 4

Charger Modes (CHRGMODE)

| SYMBOL | DESCRIPTION |
|---|---|
| SHUTDN | Shutdown mode |
| LC | Low current charging mode |
| CC | Constant current mode |
| CV | Constant voltage mode |

TABLE 5

Variables

| SYMBOL | DESCRIPTION |
|---|---|
| ADAPTERIN | T = power adaptor 214 is in use |
| CHRGCMD | Command word from host 216 to control logic unit 206 |
| BATTERR | Holds an indicator of the category of a battery error |
| BATTIN | T = battery detected, F = no battery detected |
| BATTFLTWAIT | Holds a value of time units that BATTFLT has been TRUE. |
| CR_DV | Holds a digital representation of the value of change in battery voltage during Phase 2 charging |
| CR_VO | Holds a digital version of the battery 204 voltage |
| MODE_SEL | Holds a selection flag signifying CR/CV or CC/CV charging method |
| VTAR | Holds the value of the target constant voltage during Phase 3, CR/CV method |
| CURRENT | Holds the current value to be passed to the programmable power supply 210 by control logic unit 206 |
| VBATT | Holds a value of a battery voltage |

TABLE 5-continued

Variables

| SYMBOL | DESCRIPTION |
|---|---|
| $V_{BATT\_MIN}$ | Minimum battery voltage, above which the battery may accept a standard charge current. |
| CR_I | Holds an instant constant current target for Phase 2 of CR/CV method. |
| CC_I | Holds an instant target current for Phase 2 of CC/CV method. |
| CRCHRG | T = constant voltage rate of change charging method |
| $V_{BATT\_STARTCV}$ | Battery voltage value at which constant voltage charging is to begin (crossover point). |
| $TEMP_{BATT}$ | Holds a version of a battery temperature. |

Figure 4:
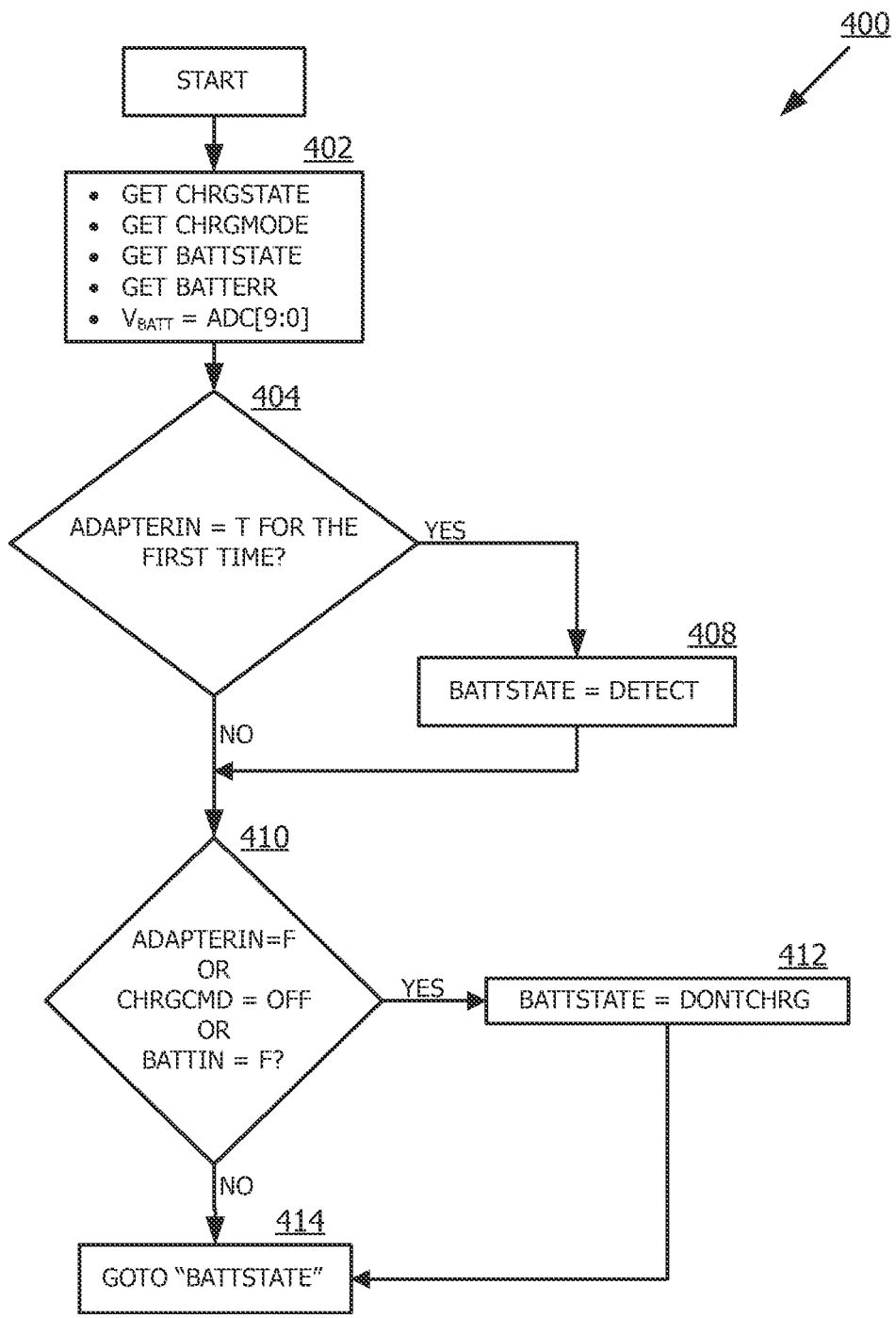
Figure 8A:
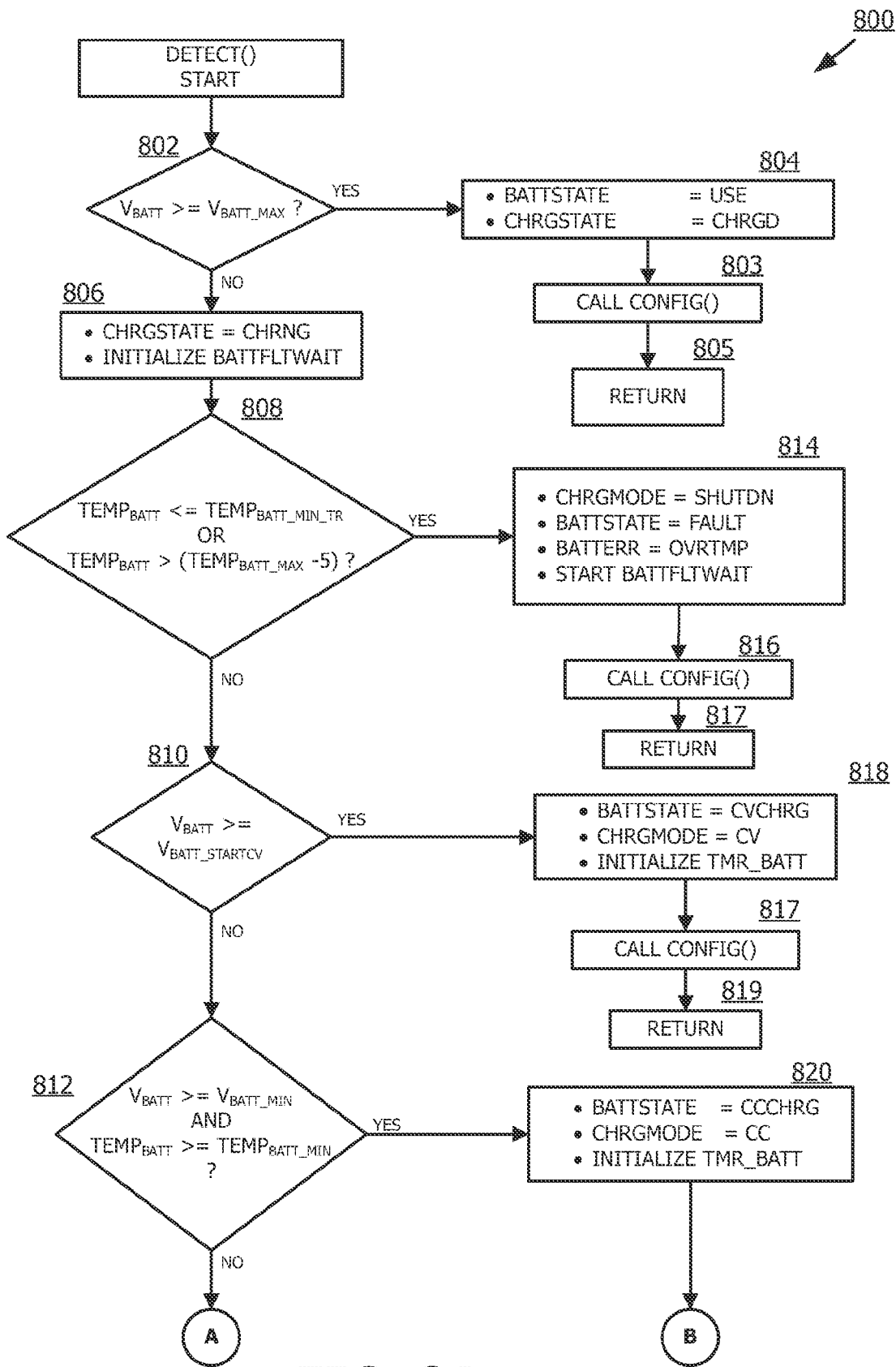
Figure 8B:
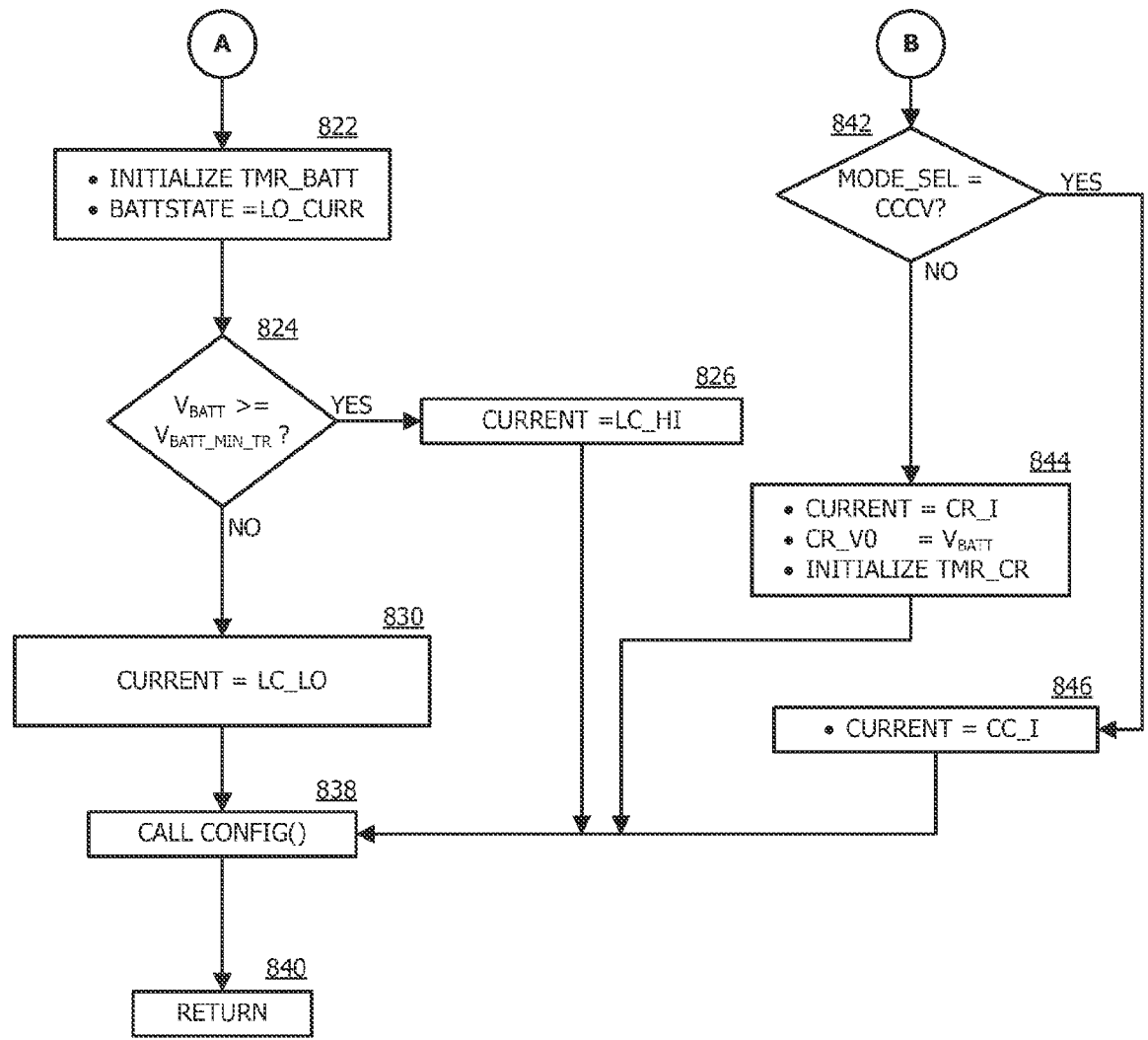

In one embodiment the logical flow of the method of the invention is provided by a program executed by control logic unit 206. FIG. 4 is an example of a program which is executed periodically, e.g., once per second. The flow 400 may be called as an interrupt service routine, resulting from a software or physical timer, or other means for periodically performing a process. For the purpose of illustration, the description of the example flow will assume flow 400 is called by an interrupt service routine. Flow 400 restores variables from a previous execution of flow 400, receives the instant value for $V_{BATT}$, then determines if any of the variables should be changed. At step 402 a digital representation for $V_{BATT}$, for example ADC[9:0] from ADC 202 on line 208, is read and saved for later use, and the charger and battery state, battery error condition, charger mode, and any other variables from a previous loop iteration are restored. In one embodiment this enables charging a plurality of batteries, wherein the variables may be called and later stored on a battery by battery basis. In the description herein, an example of charging a single battery, the data would be static, carried over from the previous iteration, therefore the steps of restoring the variable values is not necessary. In some embodiments of the present invention all or less than all of the charger apparatus and logic are embedded within a larger system, for example a switching power supply controller, which larger system samples various voltages, including $V_{BATT}$, more frequently than the time periods between the service interrupts for battery charging as described in the example herein. In such embodiments the step of reading $V_{BATT}$ at step 402 may be skipped and the most current value for $V_{BATT}$ from the larger system used. At step 404, if an adapter, for example power adapter 214, is found to be present for the first time (that is, the adapter was not found the previous loop through flow 400), BATTSTATE is set to DETECT at step 408 before proceeding to step 410. The power adapter may be detected various ways, for example by measuring the input voltage to the programmable power supply 210 by ADC 202 (connection not shown), by a status signal on line 220 from the programmable power supply 210 to the control logic unit 206, and the like. At step 410, if the adaptor is not present, or a host (if present) has commanded the charger system not to charge the battery, or if the battery is not present (Voc=0 volts), BATTSTATE is set to DONTCHARGE at step 412 before proceeding to step 414. The value of state variable BATTSTATE at step 414 will be as it was at step 402 unless it has been changed as a result of the tests at step 404 or step 410. Step 414 passes control to another process, which corresponds to the value of BATTSTATE. The next process may be DONTCHRG( ) 600, FAULT( ) 700, DETECT( ) 800, LO_CURR( ) 900, CCCHRG( ) 1000, CVCHRG( ) 1100, or USE( ) 1200.

Figure 9:
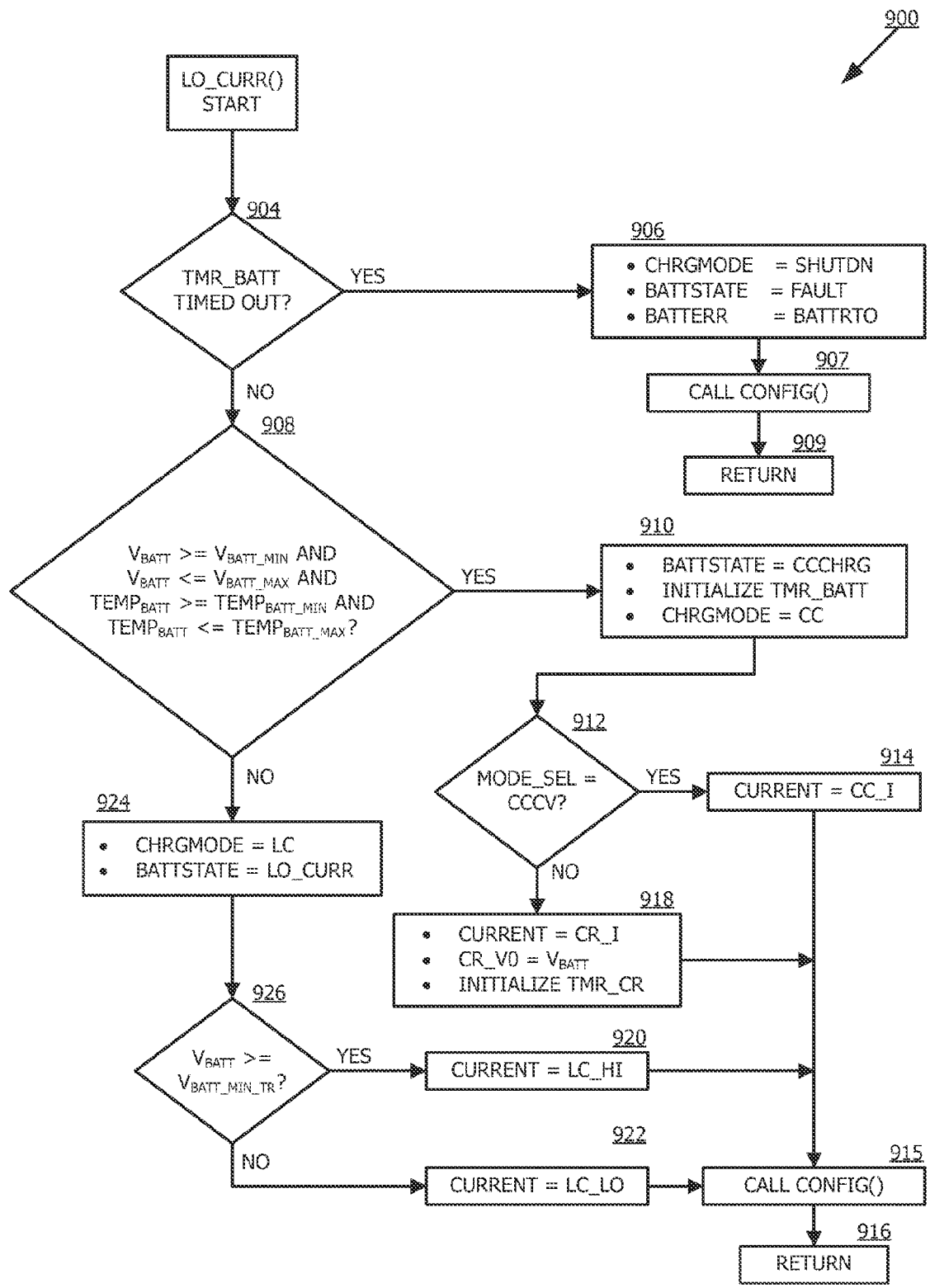

FIG. 5 is an example of a subroutine flow for configuring a programmable power supply, for example the programmable power supply 210 in FIG. 2. CONFIG( ) 500 is called by various other flows which specify a current or a voltage and a charger mode and pass the mode and target values to CONFIG( ) 500 for action. At step 502, if CHRGMODE=SHUTDN, the control logic unit 206 turns off the programmable power supply 210 at step 508. If CHRGMODE=LC, the control logic unit 206 configures the programmable power supply 210 at step 512 for a low current charge target rate previously determined by step 826 or step 830 (FIG. 8) or at step 920 or step 922 (FIG. 9). If CHRGMODE=CC, the control logic unit 206 configures the programmable power supply 210 at step 510 to provide a constant current as previously determined at step 846 or 844 (FIG. 8) or at step 914 or 918 (FIG. 9), or at step 1042 (FIG. 10). If CHRGMODE=CV, the control logic unit 206 configures the programmable power supply 210 at step 506 to provide a constant voltage, for example 4.20 volts, as previously determined at step 1004 (FIG. 10). At step 514, control is passed back to the calling routine.

FIG. 6 is an example of a flow for the condition BATTSTATE=DONTCHARG at step 414. The purpose of flow 600 is to shut down the programmable power supply 210. At step 602 CHRGMODE is set to SHUTDN, and at step 604 control is passed to CONFIG( ) 500 for action. When control returns from step 514, flow 600 exits at step 606 by returning to the interrupt service routine.

FIG. 7 is an example of a flow for the condition BATTSTATE=FAULT( ) at step 414. The purpose of flow 700 is to configure the programmable power supply 210 and to allow time for a fault condition to clear. At step 702 CHRGSTATE is set to CHRGFLT. Unless there is a change in BATTSTATE as a result of the test at step 404 or step 410, each iteration of flow 400 will pass control to FAULT( ) 700 to determine if the waiting period has expired. If the fault condition has actually cleared but the waiting period is not yet over, the system will not know it. Thus flow 700 is a time delay before going through the DETECT( ) 800 flow to assess the condition of the battery 204 and the programmable power supply 210. The cause of the instant fault may be because the battery 204 has been low current charging for too long (for example step 904), charging for too long (for example step 1008), the battery 204 is out of the proper temperature range for charging (for example step 1012, step 1106, or step 808), and such. In one embodiment the value of BATTERR indicates the instant fault type. In some embodiments the waiting period ($BATTFLTWAIT_{MAX}$) is set to a time value corresponding to the BATTERR value. For example, $BATTFLTWAIT_{MAX}$ may be set to five minutes for BATTERR=OVRTEMP and one minute for BATTDET.

In one embodiment the value of $BATTFLTWAIT_{MAX}$ is a predetermined fixed time, for example one minute. Step 704 compares the instant value of variable BATTFLTWAIT to $BATTFLTWAIT_{MAX}$. If the maximum time has not been exceeded, control passes to step 708 to simply return with no other action. If the fault condition has persisted long enough, such that BATTFLTWAIT has exceeded $BATTFLTWAIT_{MAX}$, the fault state is terminated by setting BATTSTATE to DETECT( ) at step 706, then returning to the service routine at step 708. Setting BATTSTATE to DETECT( ) allows control logic unit 206 to reassess the instant operating condition after the next iteration of flow 400. In this example BATTFLTWAIT is the value of a timer, the timer being cleared and restarted at the time of a fault detection.

Flow 800 is an example of a flow for the condition BATTSTATE=DETECT( ) at step 414. The purpose of flow 800 (described in FIG. 8A and FIG. 8B) is to test for various error conditions and, if there are none, determine whether to charge with a low current, charge with a nominal current, or charge with a constant voltage, as determined by the instant voltage of a battery, for example battery 204. At step 802 the battery 204 voltage is compared to a predetermined maximum, for example 4.19 volts. If the battery 204 voltage is above or equal to the predetermined maximum, the battery 204 is deemed to be fully charged. BATTSTATE is set to USE and CHRGSTATE is set to CHRGD at step 804, CONFIG( ) 500 is called at step 803 for action, then control returned to the service routine at step 805. If the battery 204 voltage is not above the maximum at step 802, CHRGSTATE is set to CHRNG and the fault timer BATTFLTWAIT initialized at step 806. At step 808, if the battery 204 temperature is below the minimum temperature for low current charging, for example zero degrees C., or higher than the maximum temperature for charging, for example higher than five degrees C below the manufacturer's specified maximum temperature, CHRGEMODE is set to SHUTDN, BATTSTATE set to FAULT, the fault timer BATTFLTWAIT started, and BATTERR set to OVRTEMP at step 814, then CONFIG( ) 500 is called at step 816. When control returns from CONFIG( ) 500, step 817 returns control to the service routine.

If the battery 204 temperature is within the predetermined allowable range (step 808), control passes to step 810. If at step 810 the battery 204 voltage is greater than or equal to the crossover point voltage ($V_{BATT\_STARTCV}$), for example 4.18 volts, control passes to step 818. The crossover point voltage defines the point at which constant voltage charging (Phase 3) begins. At step 818 the programmable power supply 210 is configured for constant voltage charging by setting BATTSTATE to CVCHRG, setting CHRGMODE to CV, and initializing timer TMR_BATT. CONFIG( ) 500 is called at step 817, then control returned to the service routine at step 819.

If $V_{BATT}$ is less than $V_{BATT\_STARTCV}$ at step 810, control passes to step 812. At step 812 it is already known that the battery 204 voltage is below the crossover point, a result of the test at step 810. If a battery has too low a voltage it cannot be effectively charged. At step 812 the voltage is compared to the minimum for charging ($V_{BATT\_MIN}$), for example 2.9 volts. If the battery 204 voltage is above $V_{BATT\_MIN}$ and the temperature is above the minimum for charging ($TEMP_{BATT\_MIN}$), for example zero degrees C. (it is already known that the battery 204 temperature is below the maximum, a result of the test at step 808), then the programmable power supply 210 is configured for constant current charging by branching to step 820. At step 820 BATTSTATE is set to CCCHRG, CHRGMODE is set to CC, and a timer TMR_BATT is initialized. In some embodiments the charger system is configurable to charge using either the CC/CV method or the CR/CV method. This may be selected by host 214, by a selector switch connected to control logic unit 206 (not shown), or by other means. If CC/CV charging is selected, MODE_SEL is found to equal to CCCV and step 842 branches to step 846. At step 846 the target constant current for this charging mode is set to CC_I, for example 0.5 CmA, then control passed to CONFIG( ) 500 for action at step 838. If the CC/CV method of charging is not selected (MODE_SEL<>CCCV at step 842), then the CR/CV method is used and control passes from step 842 to step 844. If a system according to the present invention does not offer the ability to select between the CC/CV and CR/CV methods, step 820 is followed by step 844 and steps 842 and 846 are not implemented. At step 844 the programmable power supply 210 is configured for CR/CV charging by setting CURRENT to CR_I, the instant battery 204 voltage is saved to memory variable CR_VO, and timer TMR_CR is initialized. As will be seen (flow 1000), both the CC/CV and CR/CV methods use a constant current during Phase 2. However, in CC/CV charging, the constant current value does not change and it is typically predetermined by the charging system designer per the battery manufacturer's specification. In CR/CV charging, the constant current value is periodically changed in response to voltage or the open circuit voltage Voc of the battery 204. At step 844 it is not yet know what value of CR_I will produce the predetermined rate of change of voltage Voc for the battery 204. The CR/CV flow (branching from step 1018) will make appropriate adjustments over time. At step 844 a predetermined current target, for example 0.1 CmA, is set as an initializing value. Other initial current values may be used, for example half of the expected maximum constant rate charging current. In some embodiments the current is not changed from the initial current until a certain time, for example ten minutes, has elapsed. As before, control is then passed to CONFIG( ) 500 at step 838. When control returns from CONFIG( ) 500 it is passed to the service routine at step 840.

If at step 812 the battery 204 voltage is found to be below the minimum value $V_{BATT\_MIN}$ or the battery 204 temperature is below the minimum temperature for charging, the battery 204 would not be able to accept charge at a high rate. The branch to step 822 is taken, to prepare for low current charging (Phase 1). The purpose of low current charging is to slowly raise the battery 204 voltage until it reaches $V_{BATT\_MIN}$, at which time Phase 2 charging is initiated. Low current charging may also raise the temperature of the battery. The battery is not charged normally until the two test conditions of step 812 are passed. At step 822, timer TMR_BATT is initialized so that the time for low current charging may be monitored, BATTSTATE is set to LO_CURR, then control passed to step 824. Low current charging is essentially constant current charging with a much lower current than that of the constant current charging of Phase 2. Step 824 determines what low current charge rate (current) is to be used. If battery 204 voltage is above $V_{BATT\_MIN\_TR}$, (the minimum for low current charging) as specified by the battery manufacturer, for example 1.0 volt, step 826 sets the appropriate current target (for example 0.05 CmA) by setting CURRENT=LC_HI before passing control to CONFIG( ) 500 at step 838. In some embodiments, if the battery 204 voltage is below the minimum for low current charging $V_{BATT\_MIN\_TR}$ (step 824), then a very low charge current LC_LO (for example, 0.01 CmA) is set at step 830 before passing control to CONFIG( ) 500 at step 838. The purpose of the lower current of step 830 is to bring the battery 204 up to the voltage $V_{BATT\_MIN\_TR}$, at which point a standard low current charge may be used. When CONFIG( ) 500 returns, step 840 returns control to the service routine. In some embodiments only one low current charge rate is used, eliminating steps 824, 826, and 830. In that case, step 822 sets a target low current charge current (CURRENT=LC_HI) before passing control to step 838 and subsequently returning to the service routine at step 840.

Flow 900 is an example of a flow for the condition BATTSTATE=LO_CURR at step 414. The purpose of flow 900 (described in FIG. 9) is to provide a low current for charging a battery, for example battery 204. Low current charging is needed when a battery is deeply discharged or for any reason has a very low voltage, for example below 1.0 volts. Low current charging is also recommended when a battery is very cold, for example below zero degrees C. A battery with very low voltage or temperature cannot accept a standard constant current charging rate (such as provided during Phase 2) without damage. In the example of flow 800, step 812 may determine that the battery 204 voltage is less than $V_{BATT\_MIN}$ or colder than $TEMP_{BATT\_MIN}$. In that event, step 822 sets BATTSTATE to LO_CURR( ) and initializes TMR_BATT. The next iteration of flow 400 results in control passing to LO_CURR( ) 900. At step 904, TMR_BATT is checked for the timeout condition. If TMR_BATT has timed out, we assume there is a problem with the battery 204 or the charger and branch to step 906. Step 906 stops charging by setting CHRGMODE to SHUTDN, BATTSTATE to FAULT, and BATERR to BATTRTO. Shutdown is then requested by calling CONFIG( ) 500 at step 907, and control returned to the service routine at step 909.

If the charger has been low current charging for less than the maximum time (TMR_BATT not timed out), step 904 branches to step 908. At step 908 battery 204 voltage and temperature are checked to see if both are within the recommended range for constant current charging (Phase 2). If so, Phase 2 charging is set up at step 910 by setting BATTSTATE=CCCHRG, initializing TMR_BATT, and setting CHRGMODE=CC. The branch from step 910 is similar to the branch from step 820 in DETECT( ) 800. In some embodiments step 910 sets up for the next iteration of flow 400 to branch to DETECT( ) 800. In one embodiment step 908 (if "YES") branches to step 820 and the logical flow continues from there.

In the example shown, flow 900 repeats the logic corresponding to steps 820, 842, 844, 846, 838, and 840 in steps 910, 912, 918, 914, 915, and 916 respectively. The flow 910 through 916 is the same as the flow of step 820 through 840, and the description is not repeated here.

If at step 908 the battery 204 voltage or temperature are out of the desired range, step 924 sets CHRGMODE=LC and BATTSTATE=LO_CURR. In some embodiments of the present invention there is only one low current charge rate (current), which is written to variable CURRENT before calling CONFIG( ) 500 and returning control to the service routine. In the example of flow 900, step 926 determines if the battery 204 voltage is below a certain value, for example 1.0 volt. If so, CURRENT is set to a low current value LC_LO, for example 0.01 CmA, at step 922. If battery 204 voltage is not less than $V_{BATT\_MIN\_TR}$, then a higher low current charge current LC_HI, for example 0.05 CmA, is written to CURRENT at step 920. The low current charge rate may have been earlier set at step 826 or 830 of DETECT( ) 800. The test at step 926 determines if the voltage of the battery 204 has increased enough to progress from a lower low current charge (LC_LO) to a higher one. Whether step 920 or step 922 is taken, the programmable power supply 210 is configured by calling CONFIG( ) 500 at step 915, then control returned to the service routine at step 916.

Flow 1000 is an example of a flow for the condition BATTSTATE=CCCHRG( ) at step 414. The purpose of flow 1000 (described in FIG. 10A, and FIG. 10B, and FIG. 10C) is to provide constant current charging to a battery, for example battery 204, while testing for a condition indicating that Phase 2 is over. At step 1002 the voltage of battery 204 is compared to $V_{BATT\_STARTCV}$, for example 4.18 volts, which indicates constant current charging is to stop and constant voltage charging is to begin, the condition previously denominated the "crossover point." If the crossover point has been reached, the branch to step 1004 is taken. At step 1004 constant voltage charging is set up by setting BATTSTATE to CVCHRG, CHRGMODE to CV, initializing TMR_BATT, and setting $V_{TAR}$ to the desired constant voltage $V_{BATT\_MAX}$, for example 4.20 volts. Setup is completed by calling CONFIG( ) 500 at step 1016, and returning control to the service routine at step 1020.

If the test fails at step 1002, TMR_BATT is checked for timeout at step 1008. If TMR_BATT has timed out, we assume that charging has continued for too long due to an unknown problem. The branch to step 1010 sets CHRGMODE=SHUTDN, BATTSTATE=FAULT, and BATTERR=BATTCCTO to shut down the programmable power supply 210. The action is completed by calling CONFIG( ) 500 at step 1016, and returning control to the service routine at step 1020.

If TMR_BATT has not timed out (step 1008), step 1012 checks the temperature of battery 204. If the battery temperature is too high, for example over 40 degrees C., step 1014 shuts down the programmable power supply 210 (CHRGMODE=SHUTDN, BATTSTATE=FAULT) and sets the fault condition BATTERR=OVRTEMP. The action is then completed by calling CONFIG( ) 500 at step 1016 and returning control to the service routine at step 1020.

If the battery 204 temperature is within charging range (at step 1012), control branches to step 1018 from step 1012. If the charger has not been configured to operate in accordance with the CR/CV method (selection means was discussed earlier), no further action is needed, the current target for CC/CV having been set earlier at step 914 or step 820, therefore step 1020 returns control to the service routine. If, however, MODE_SEL=CRCV, the constant charging current CR_I may be modified. Timer TMR_CR was earlier initialized at step 844. At step 1022 TMO_CR is incremented. At step 1024 TMR_CR is checked for equality to the time out value TMR_CR$_{MAX}$, for example one minute (a count of 60 d if flow 400 is being called once per second). If TMR_CR equals TMR_CR$_{MAX}$, step 1026 shuts down the programmable power supply 210, then calls CONFIG( ) 500 at step 1028, then returns control to the service routine at step 1028. Note that BATTSTATE is not changed, timer TMR_CR is not reinitialized, no fault condition is declared, and the programmable power supply 210 remains shut down. The purpose of shutting down the programmable power supply 210 at step 1026 is so that the open circuit voltage (Voc) of battery 204 may be read by ADC 202 at step 402. Voc of battery 204 corresponds to the state of charge of battery 204, as previously discussed. Because BATTSTATE is still CCCHRG, the flow will branch to CCHRG( ) 1000 from step 414 (providing step 404 and step 410 do not intervene). Assuming tests 1002, 1008, 1012 are still FALSE and MODE_SEL is still equal to CRCV, timer TMR_CR will be incremented at step 1022, the step 1024 test will now be FALSE, and control will branch to step 1032. The purpose of the test for TMR_CR greater than time out at step 1032 is not to determine a fault condition, but to check the change in Voc after having determined the open circuit voltage Voc in the previous loop. That is, until TMR_CR$_{MAX}$ has been attained, the flow will be steps 1024, 1032 and return to the service routine at step 1046. When TMR_CR$_{MAX}$ is attained (exactly) the open circuit voltage Vo is read. Then, the next time through flow 1000, the test at step 1032 will be TRUE and the branch to step 1034 taken. As described hereinafter, the purpose of the branch through step 1034 is to determine if the value of CURRENT needs to be modified, then the timer TMR_CR reset and again we wait for the test at step 1024 to be TRUE.

At step 1034 the change in Voc (CR_DV) relative to the previous value is found by taking the difference between $V_{BATT}$ (which is Voc from the just-completed iteration of flow 400, during which the programmable power supply 210 was shut down) and CR_VO, wherein CR_VO holds Voc from an earlier step 1042 or from step 844 during DETECT( ) 800 or step 918 during LO_CURR( ) 900. A MAX function is used at step 1034 to insure that CR_DV does not return a negative value. Step 1036 checks to see if CR_DV is zero. If CR_DV is zero, the voltage of the battery 204 is not rising, so at step 1040 a value for a new constant current is found that is mid-way between the instant CR_I and the maximum current CR_I$_{MAX}$, for example 1.0 CmA. At step 1042, CURRENT is set to the new value of CR_I (from step 1040 or step 1038), timer TMR_CR reinitialized, the instant Voc (V$_{BATT}$) saved to CR_VO, and the programmable power supply 210 brought out of shut down by setting CHRGMODE=CC. Action is then taken at step 1044 by calling CONFIG( ) 500, then returning control to the service routine at step 1046. At step 1040 the exact value of CR_I adjustment that will provide the desired dV/dT is not known. The purpose of step 1040 is to provide a rising Voc, which will then allow a scaling procedure (step 1038) to configure the charger to attain the target dV/dT. When dV/dT is positive, step 1036 will branch to step 1038. Step 1038 scales the instant current CR_I per the formula $$\text{Constant rate curren} = (\text{Constant rate current}) * \left(\frac{(dV/dT)_{TAR}}{(dV/dT)}\right), \quad [\text{EQ 1}]$$

where constant rate current=CR_I, dV/dT$_{TAR}$=CRDV$_{tar}$, and dV/dT=CR_DV from step 1034. In some embodiments the time interval between measurements of V$_{BATT}$, for example one second, is fixed and predetermined. In such an embodiment [EQ 1] may be simplified to:

$$\text{Constant rate current} = (\text{Constant rate current}) * \left(\frac{dV_{TAR}}{dV}\right), \quad [\text{EQ 2}]$$

In CC/CV charging, charging current during Phase 2 is fixed throughout the phase, with the potential for problems previously described. With the CR/CV charging method of the present invention, the Phase 2 constant current is periodically changed to provide an approximately constant change in Voc per unit time. That is, with the CC/CV method, Phase 2 current is fixed at a predetermined value, but with the CR/CV method it is the change of open circuit voltage per unit time that is constant. The "constant" current during Phase 2 in the CR/CV method is constant during a time period (for example, TMR_CR), then changed as needed for the next time period in order to maintain a constant rate of change of battery voltage. Consider a typical Li-ion battery. The manufacturer's specification may, for example, indicate that Phase 2 should last approximately 40 minutes at a current of 0.5 CmA while VBATT increases from 2.9 volts to 4.20 volts. In the method of the present invention, CRDV$_{TAR}$ is found by CRDV$_{TAR}$=dV/dT$_{TAR}$=(4.2−2.9)/40=0.0325 volts per minute.

Except where the required current exceeds the capabilities of the programmable power supply 210, CR_I will be varied as needed to maintain dV/dT$_{TAR}$. If, for an example using the example above and assuming TMR_CR$_{MAX}$ is two minutes, Voc is checked twenty times during Phase 2 and the current adjusted (if needed) each time to control dV/dT to approximately 0.06 volts rise after each iteration of CCCHRG( ) 1000, step 1042. Voc increases approximately linearly, and the time duration of Phase 2 will be approximately the same for every battery of the same type/spec, regardless of condition or temperature.

Following step 1038, control then branches to step 1042 to set up configuration (as previously described), including bringing the programmable power supply 210 out of shut down, then takes action at step 1044 by calling CONFIG( ) 500, then returning control to the service routine at step 1046.

Figure 10A:
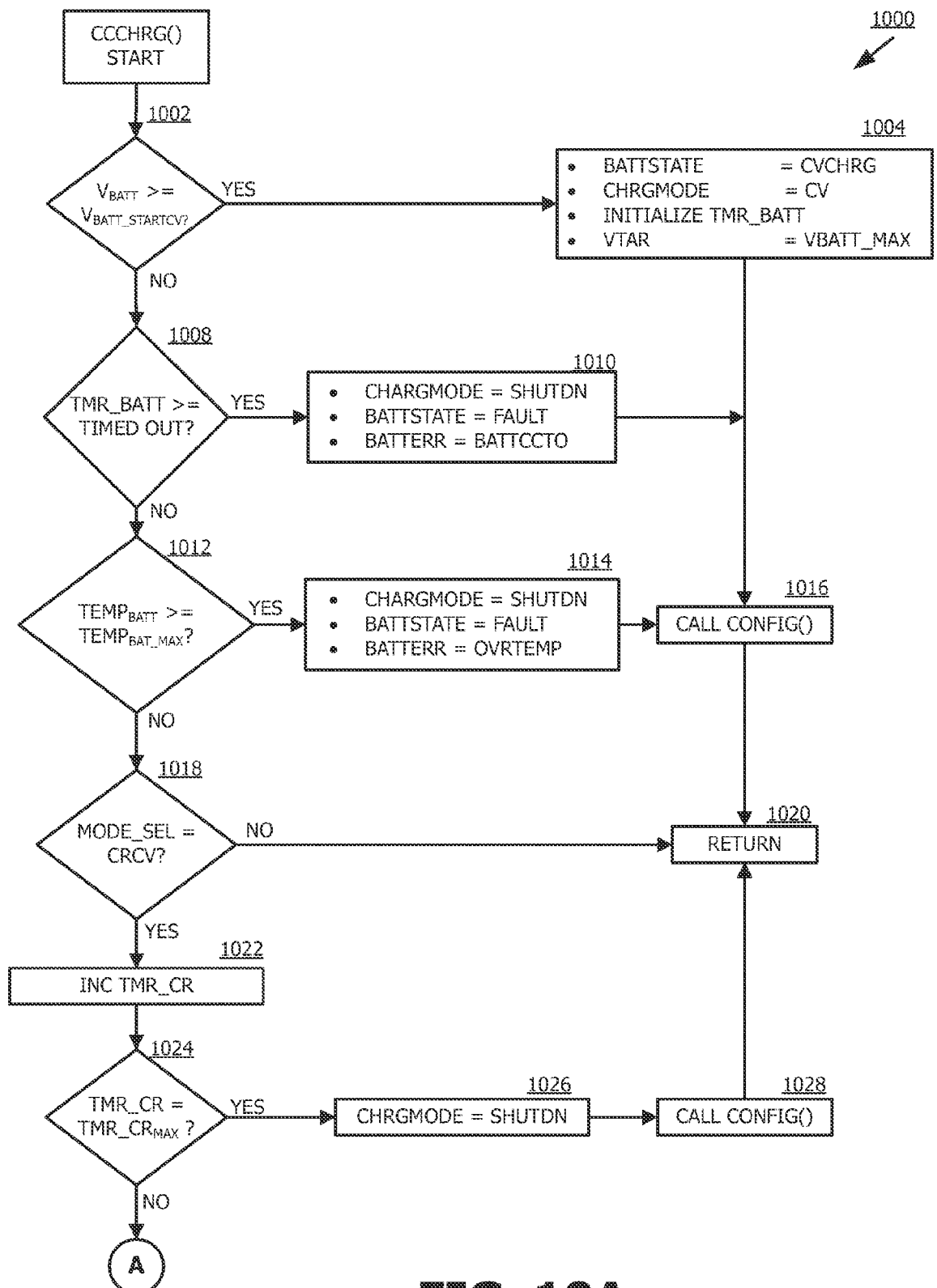
Figure 10B:
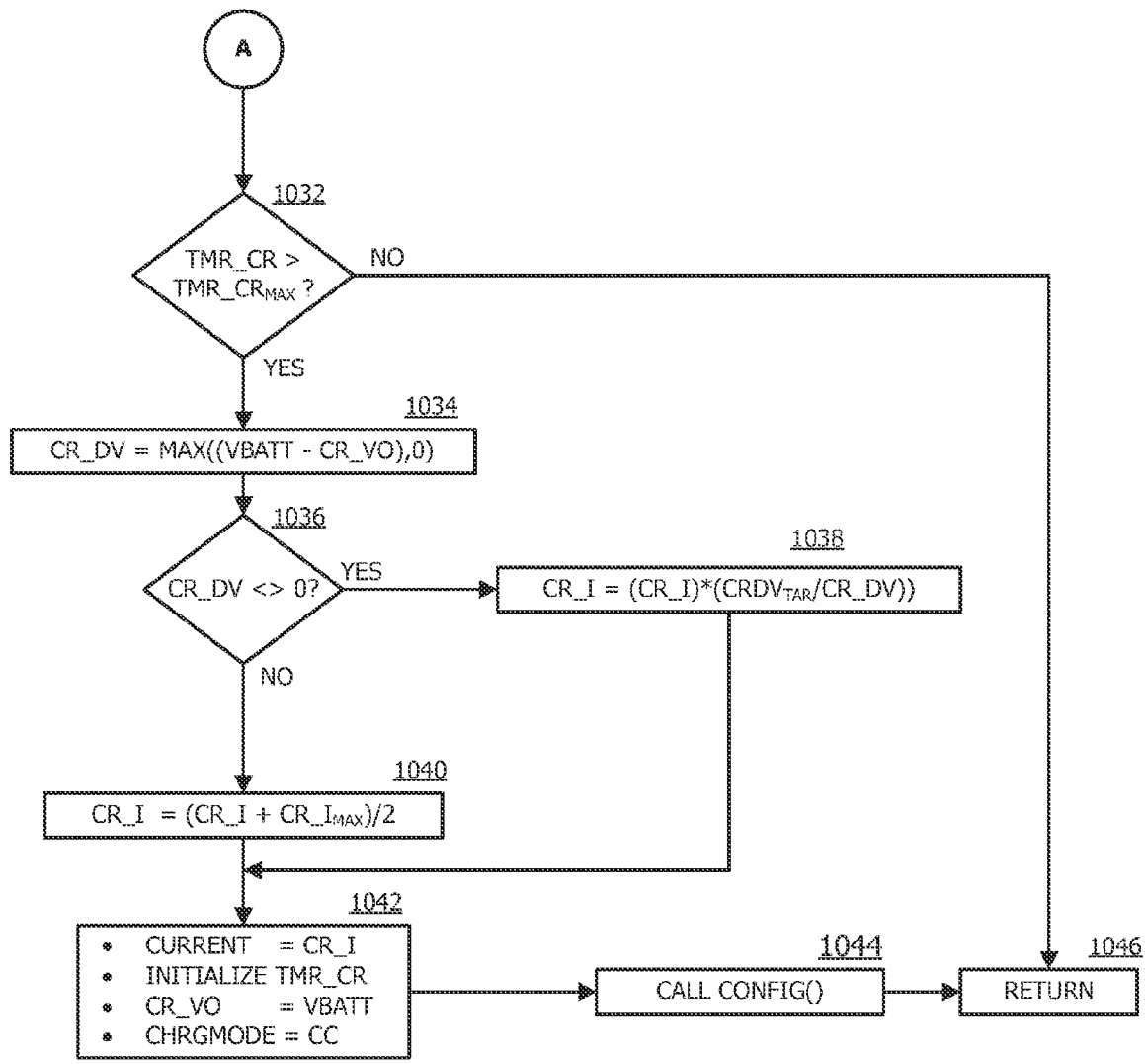
Figure 10C:
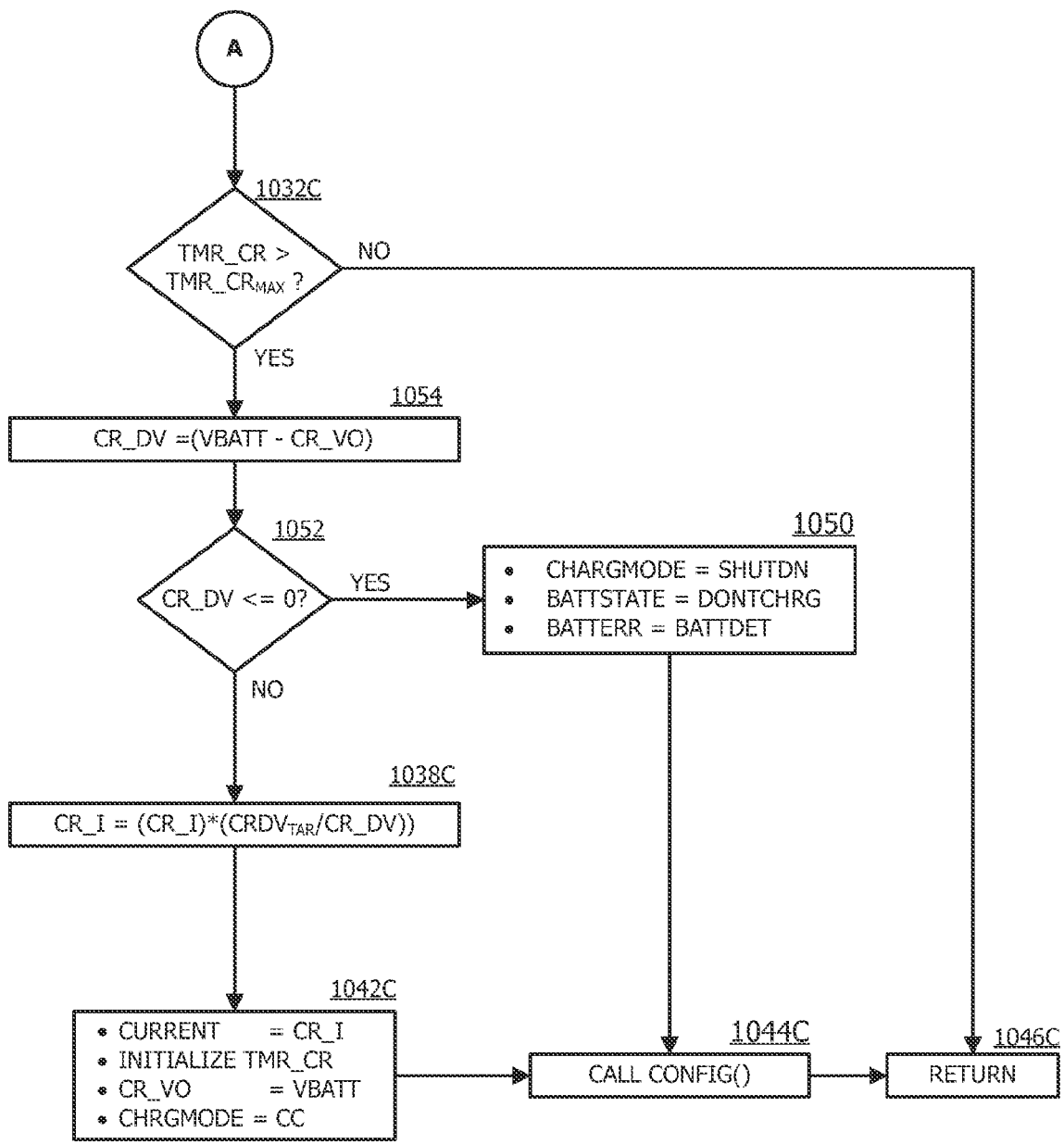

In some embodiments that portion of Flow 1000 illustrated by FIG. 10B is instead represented by the flow shown in FIG. 10C. In particular, after step 1032C the change in voltage is not limited to a minimum of zero volts (step 1036, FIG. 10B) but is found per step 1054. A test at step 1052 determines if the battery open circuit voltage (V$_{BATT}$) is decreasing or holding steady. Energy being put into the battery (charging current) without the battery voltage increasing may be an indication of present or impending battery failure. If TRUE (step 1052), the battery is deemed to be in a failure mode from which the charging system cannot recover. Charging is stopped entirely by branching to step 1050, where CHRGMODE is set to SHUTDN and BATTSTATE is set to DONTCHRG, then action taken at step 1044C by calling CONFIG( ) 500, then returning control to the service routine at step 1046C. Thereafter Flow 400 will continuously branch to Flow 600 until an action apart from the flows described here occurs, such as intervention by a host 216, removal of all power causing a resetting of the system, and the like. In one embodiment BATTERR is set to BATTDET for later communication by the control logic unit 206 to a host 216. If CD_DV is greater than zero, as determined at step 1052, the flow continues through steps 1038C, 1042C, 1044C and 1046C. Steps 1032C, 1038C 1042C, 1044C, and 1046C correspond to the similarly numbered blocks in FIG. 10B and are not further described here.

The test at step 1052 is more generally denominated "battery failure test". Other tests than simply decreasing battery voltage may be used to determine an actually or impending battery failure. For example, in one embodiment a battery is deemed to be failing when a rolling average of battery voltage values is not increasing. In another embodiment the battery failure test comprises obtaining a representation of the battery temperature and determining that failure is possible if the temperature exceeds a certain value. In another a certain maximum rate of temperature increase, alone or in conjunction with a negative change of Voc, is used as an indication of failure The temperature is sometimes obtained by placing a thermocouple in or near the battery and reading the voltage of the thermocouple with the ADC 202. In some embodiments a battery is deemed to be failing in a CC/CV profile even though Voc is increasing but the rate of increase changes, for example flattens out or decreases.

In one embodiment a pressure transducer is included in the battery and failure determined to be possible at a certain pressure. The value of pressure is obtained by reading the pressure transducer with the ADC 202. In some embodiments a strain gauge formed as part of the battery enclosure is read by the ADC 202 in order to detect swelling of the enclosure, again indicating possible battery failure, even when the battery is being neither charged nor discharged.

Figure 14:
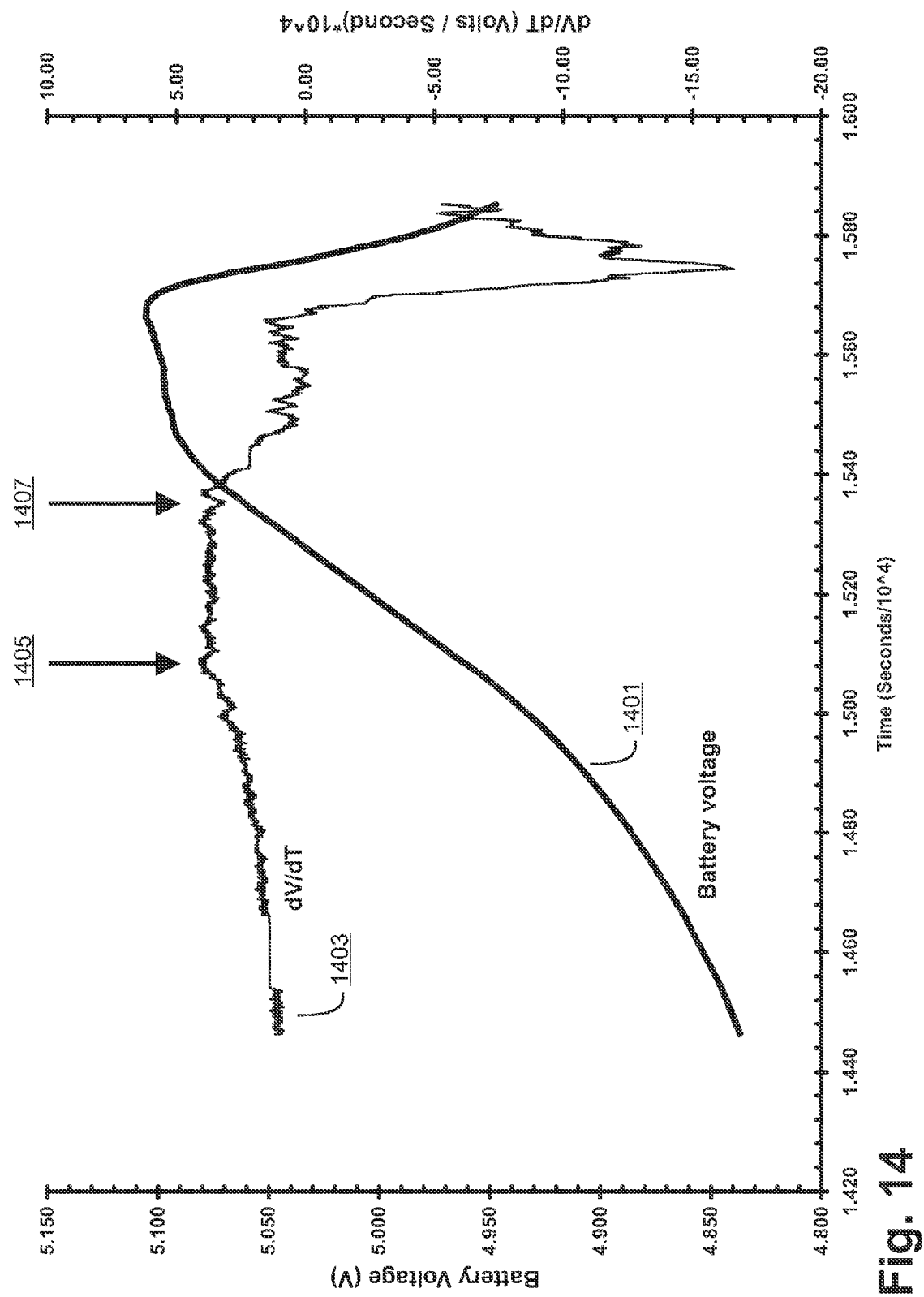
FIG. 14 illustrates the voltage and change of voltage over time during a battery failure.

For an example, we look to FIG. 14. FIG. 14 presents data recorded in a laboratory environment wherein a battery was overstressed in order to examine the battery failure mechanism. Battery protective circuits were defeated, then the battery exposed to high voltage and/or current until failure was seen. Curve 1401 represents battery voltage over a time window of approximately twenty three minutes, with data taken approximately every second. Curve 1403 represents the calculated rate of change in Vo. Data was taken with an approximately fixed current to observe the behavior of the battery voltage. At point 1405 we see a change in the slope of dV/dT.

In some embodiments the condition of point 1405, wherein dV/dT becomes relatively constant, is deemed a condition for reporting a battery failure at step 1502. In one embodiment the condition of point 1407, wherein dV/dT begins decreasing, is deemed a condition for reporting a battery failure at step 1502. In an embodiment digital filtering of the Vo data is employed and the second derivative of filtered Vo values is used to determine battery failure, for example if $dV^2/dT^2$ is negative.

In an embodiment of the CR/CV method, wherein dV/dT is being controlled to a steady value by the control loop as previously described, the value of the current required to maintain the target dV/dT is examined in a manner similar to the examination of the voltage of the CC/CV method explained earlier, unexpected charging current changes being possible indications of battery failure. For example, a sudden increase in charging current may indicate localized shorting between conducting plates of the battery.

In an embodiment of the present invention step 1050 further comprises an action or actions to avoid or diminish battery failure effects, such as fire, out gassing, chemical leakage, case rupture, and extreme temperature. For example, in one embodiment a power transistor with low on-resistance (Rds_on) is connected between the positive and negative battery terminals. If battery failure is detected, the power transistor is driven to its ON state. Turning on the transistor shorts out the battery and would generate significant heat, but the shorting current flows through a large portion of the surface area of the battery instead of a localized heating area. In an embodiment the power transistor is pulsed ON and OFF intermittently to allow some thermal energy to dissipate between ON periods. In another embodiment, an electrically operated value is activated. Many such emergency actions permanently disable the battery, but with the benefit of avoiding damage beyond the battery itself.

Figure 11:
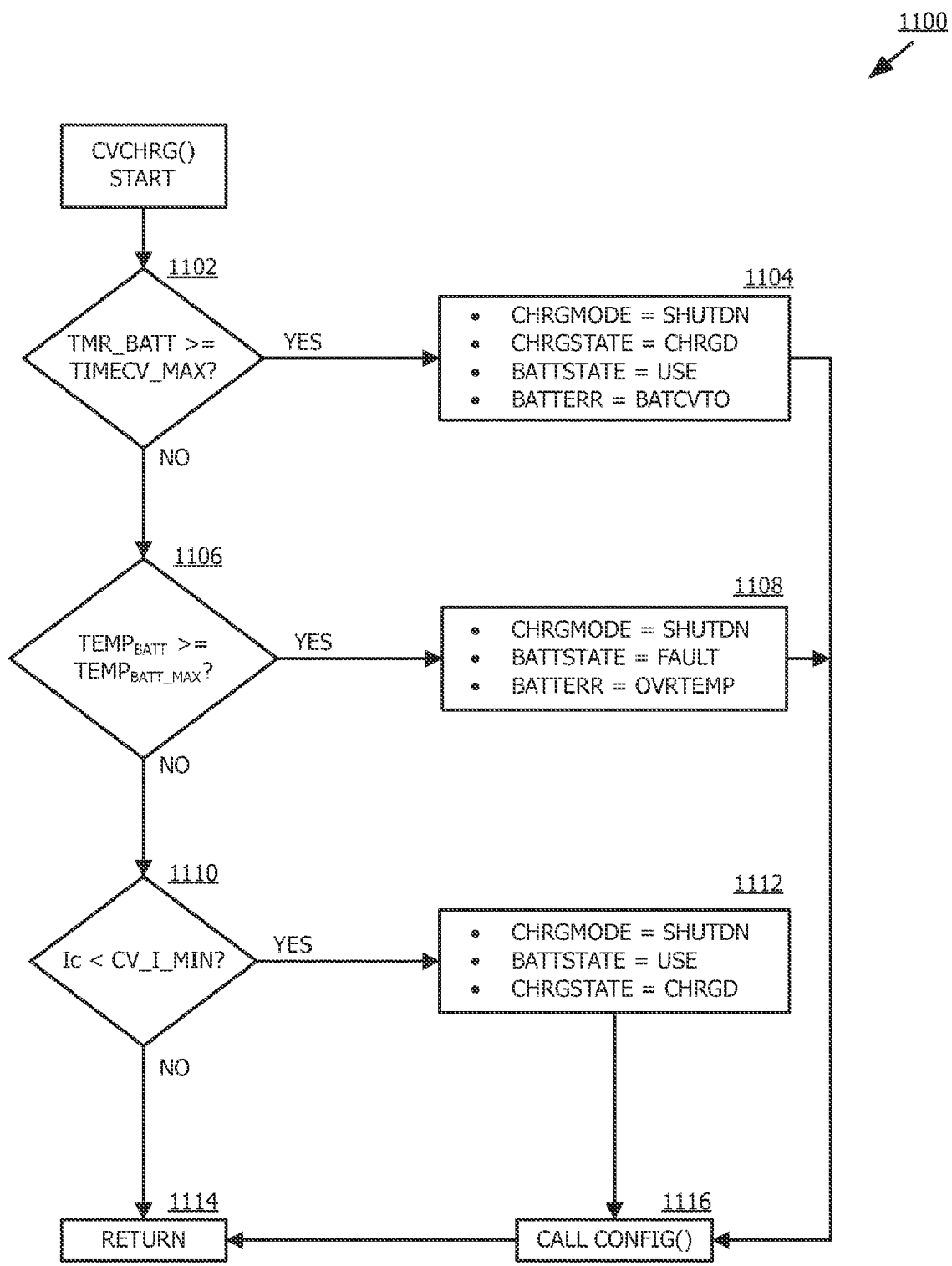

Flow 1100 is an example of a flow for the condition BATTSTATE=CVCHG at step 414. The purpose of flow 1100, described in FIG. 11, is to provide constant voltage charging of a battery, for example battery 204, while monitoring for error conditions and an end point condition. This phase as been previously denominated "Phase 3", and begins at the crossover detection point, previously described. Flow 1100 is the result of the test at 1002 and set up at step 1004, where timer TMR_BATT was initialized or it is the result of the test at step 810 and set up at step 818. At step 1102 the timer TMR_BATT is examined for a timeout condition. If TMR_BATT has timed out during Phase 3, for example in excess of 60 minutes, battery 204 is treated as fully charged (though it may or not be so) by branching to step 1104 to shut down programmable power supply 210 by setting CHRGMODE to SHUTDN. The charger system is set up by setting CHRGTSTATE to CHRGD, and BATTSTATE to USE. BATTERR is set to BATTCVTO, which in one embodiment is not used by control logic unit 206, but may be of interest to host 214 if present. Action is taken by calling CONFIG( ) 500 at step 1116, then returning control to the service routine at step 1114.

If TMR_BATT has not timed out (step 1102), step 1106 is taken wherein the temperature of battery 204 is compared to the maximum temperature $TEMP_{BATT\_MAX}$, for example 45 degrees C. If the battery 204 temperature is equal to or greater than $TEMP_{BATT\_MAX}$, step 1108 is taken to shut down programmable power supply 210, set BATTSTATE to FAULT, and pass the indication of fault type by setting BATTERR to OVRTEMP. Action is taken by calling CONFIG( ) 500 at step 1116, then control returned to the service routine at step 1114.

If $TEMP_{BATT\_MAX}$ has not been exceeded (step 1106), step 1107 is taken wherein the value of the current Ic 310 through battery 204 is compared to the value of the battery 204 current Ic 310 (IC_last) from a previous iteration of flow 1100. If the instant value of the battery 204 current Ic 310 has increased (i.e., Ic 310 is greater than Ic_last) step 1109 is taken to shut down programmable power supply 210, set BATTSTATE to FAULT, and pass the indication of fault type by setting BATTERR to OCURRENT. Action is taken by calling CONFIG( ) 500 at step 1116, then control returned to the service routine at step 1114. An increase in battery 204 current Ic 310 during the constant voltage Phase 3 may indicate instant or impending battery failure, and charging is immediately stopped.

If the test at step 1107 is FALSE, Ic 310 is compared to CV_I_MIN at step 1110. Ic 310 may be known by measuring the voltage across a sensing resistor $R_{SENSE}$ 205 by ADC 202, by a comparator across resistor $R_{SENSE}$ with a reference voltage of (CV_I_MIN*$R_{SENSE}$), or other means for measuring the charging current which one skilled in the art would know. In some embodiments Ic 310 is reported to control logic unit 206 by programmable power supply 210. If at step 1110 the current Ic is less than CV_I_MIN, the battery 204 is deemed to be fully charged and Phase 3 is terminated. In one embodiment the end point condition is not determined based upon current Ic 310 but rather is defined as the open circuit voltage Vo equal to a certain value, for example 4.20 volts. In such an embodiment the test at step 1110 reads "Vo>=$V_{BATT\_MAX}$?". Phase 3 is terminated at step 1112 by setting CHRGMODE to SHUTDN to shut down programmable power supply 210, setting BATTSTATE=USE, and CHRGSTATE=CHRGD. Action is taken by calling CONFIG( ) 500 at step 1116, then control returned to the service routine at step 1114. If the current Ic 310 is greater than CV_I_MIN at step 1110 (or Vo<$V_{BATT\_MAX}$ in one embodiment) constant voltage charging continues by simply returning control to the service routine at step 1114.

In one embodiment the value used for CV_I_MIN is specified by the battery manufacturer to a certain predetermined value, for example 0.1 CmA. Though commonly practiced in the industry, an absolute value of 0.1 CmA may present problems. For example, if a battery is significantly compromised (many charge/discharge cycles, damaged, very high temperature, and such), 0.1 CmA may represent a significantly high value (current) compared to the instant capacity of the subject battery. Thus using the predetermined current value recommended by the battery manufacturer may under charge the battery, storing less charge than possible in an already compromised battery, providing poor performance to the user. In some embodiments of the present invention, the value of current at the crossover point (that is, the instant value of CR_I from step 1042) is scaled, for example (0.1*CR_I), and saved as CV_I_MIN. Thus in some embodiments the test at step 1110 is checking to see when the current Ic 310 is reduced to a predetermined percentage, for example ten percent, of the value of the current at the crossover point rather than a predetermined current absolute value.

Figure 12:
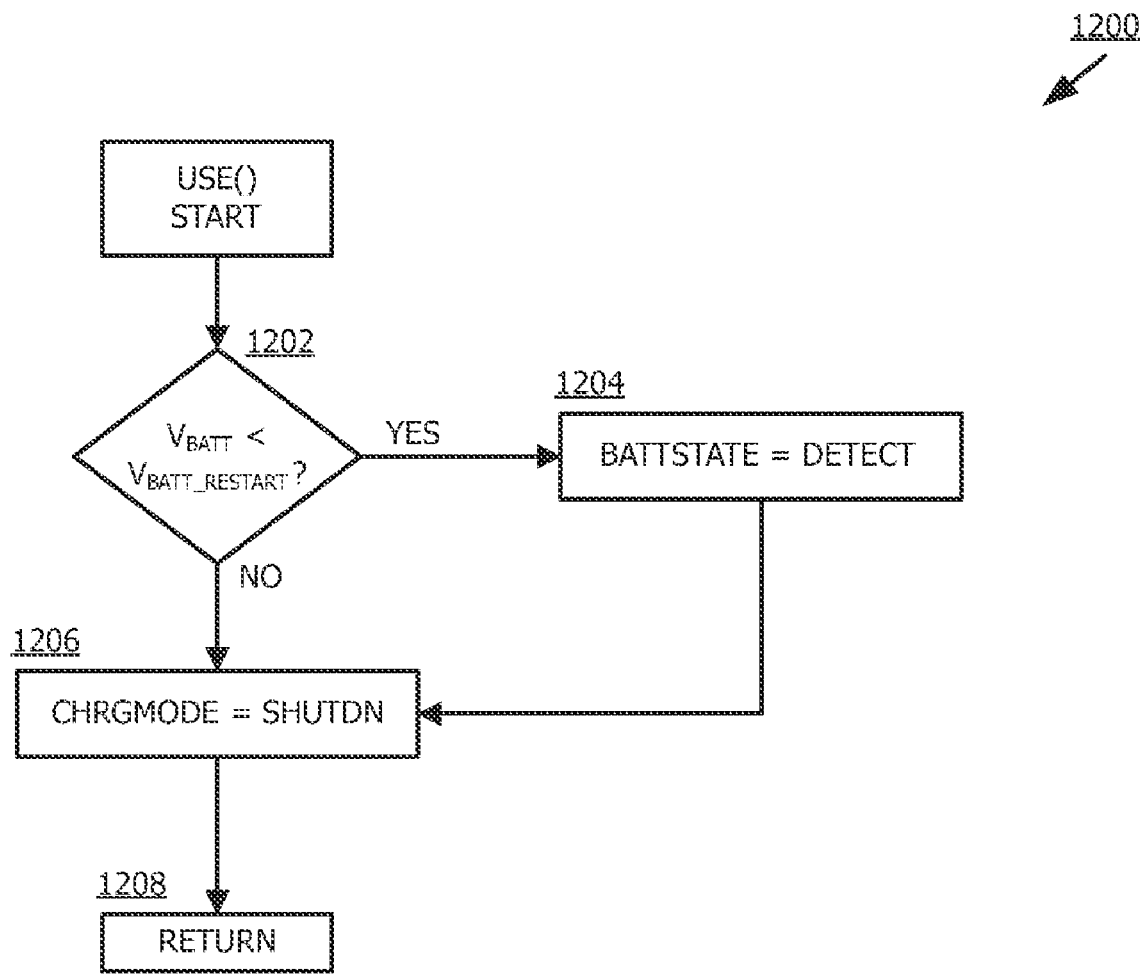

Flow 1200 is an example of a flow for the condition BATTSTATE=USE at step 414. The purpose of flow 1200, described in FIG. 12, is to provide for battery power to be available to power a load. In a stand alone charger, for example, the battery voltage may be monitored to determine that the battery has not self-discharged (or experienced leakage through the charger) such that it needs to be recharged. In a system wherein the charger and the battery are embedded within a larger system, for example a cell phone or digital camera or one of many other devices which include a feature for charging a battery without removal, flow 1200 may provide status information to the larger system, for example a host 214. At step 1202 the voltage of a battery, for example battery 204, is compared to a voltage $V_{BATT\_RESTART}$, for example 3.9 volts, to determine if the battery 204 should be recharged. The value of $V_{BATT\_RESTART}$ is determined by the system designer, depending upon the needs of the system. If the voltage of battery 204 is above the restart voltage $V_{BATT\_RESTART}$, CHRGMODE is set to SHUTDN (which may already be the mode) at step 1206, which removes the programmable power supply from the battery 204. Control is then returned to the service routine at step 1208. If $V_{BATT}$ is less than $V_{BATT\_RESTART}$, this condition is reported to control logic unit 206 by setting BATTSTATE to DETECT( ) at step 1204, and returning control to the service routine at step 1208. This will cause the next iteration of flow 400 to branch to flow DETECT( ) 800, where the next step will be determined as previously described.

Figure 13:
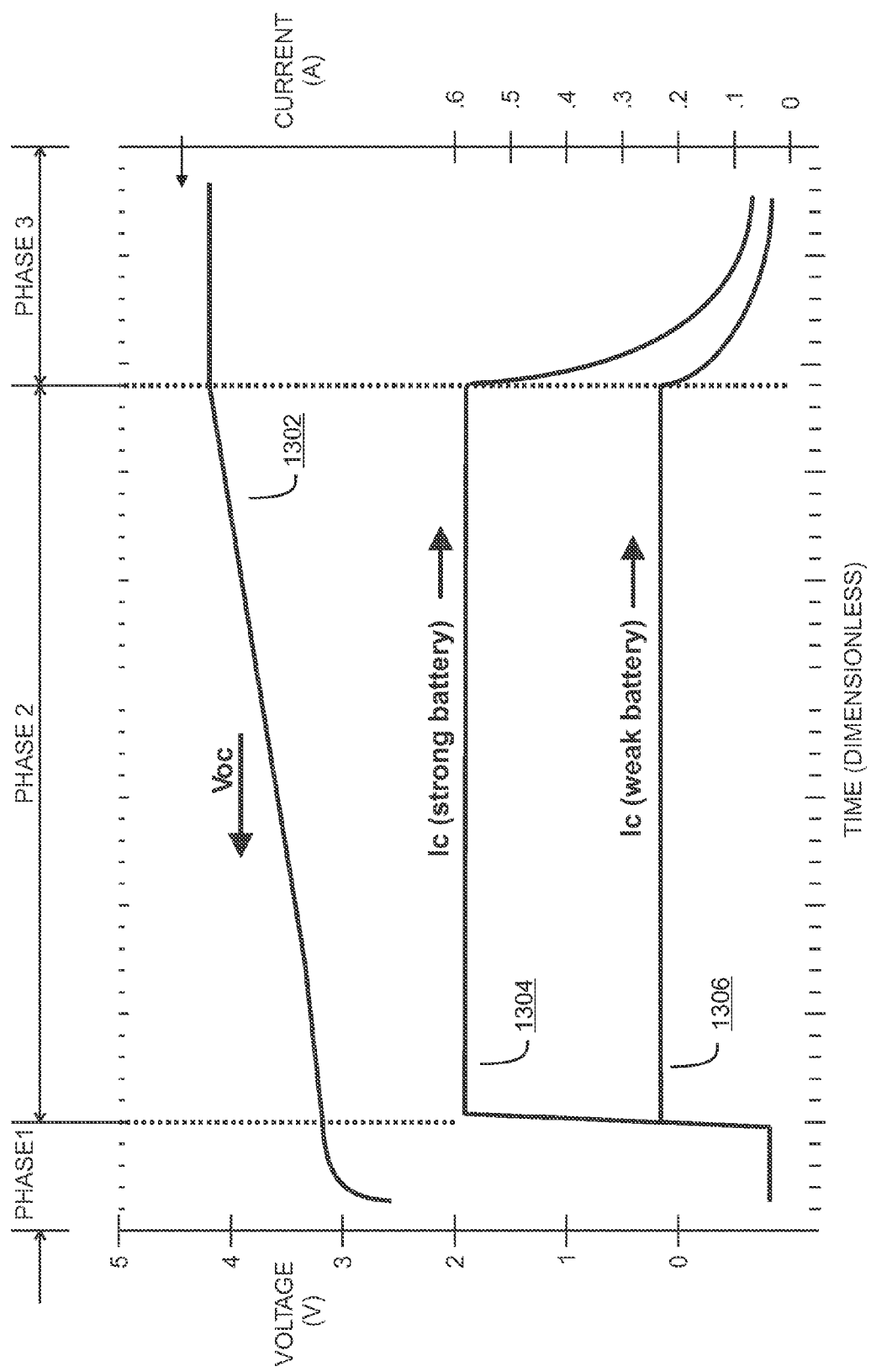
FIG. 13 is an idealized graph of the voltage and current profiles for charging a strong and a week battery, each with the method of the present invention.

FIG. 13 presents the voltage and current values of a typical battery, such as battery 204, charged in accordance with the present invention. Note the profile of current Ic 310 during Phase 2 in comparison with the fixed current of the prior art, as shown in FIG. 1. Curve 1302 represents the open circuit battery voltage Voc over time. Curve 1302 is essentially linear from the time charging current Ic 310 is stabilized in Phase 2 until the crossover point. Curves 1304 and 1306 illustrate current curves for two different batteries; curve 1304 is representative of a strong battery and curve 1306 is representative of a weak battery being charged. For any given battery 204 in a given singular charging cycle only one curve will represent the charging experience of the battery 204 being charged. For example, a strong, fresh, warm battery may accept the higher charging current represented by curve 1304. The energy delivered to (and stored by) the battery 204 is the area under the charging current curve over the time period in which current is provided. A weak or damaged battery may charge with a current Ic 310 profile similar to curve 1306. Note that the charging time for both the strong and the weak battery is the same, but the area under the curve of curve 1306 is less than the area under the curve of curve 1304, illustrating the difference in power delivered (and subsequently available).

In the above description of the method of the present invention, battery open circuit voltage values are used. Looking to FIG. 3, we see that in measuring open circuit voltage the resistors have no effect; there is no current to cause a drop. Thus open circuit voltage is used in determining the state of charge of a battery. Said differently, it represents the charge stored on the capacitors of the model. However battery voltage while connected to the charging system (that is, not open circuit voltage) is sometimes used in looking for voltage change conditions.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

RESERVATION OF EXTRA-PATENT RIGHTS, RESOLUTION OF CONFLICTS, AND INTERPRETATION OF TERMS

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

Unless expressly stated otherwise herein, ordinary terms have their corresponding ordinary meanings within the respective contexts of their presentations, and ordinary terms of art have their corresponding regular meanings Given the above disclosure of general concepts and specific embodiments, the scope of protection sought is to be defined by the claims appended hereto. The issued claims are not to be taken as limiting Applicant's right to claims disclosed, but not yet literally claimed subject matter by way of one or more further applications including those filed pursuant to 35 U.S.C. §120 and/or 35 U.S.C. §251.

We claim:

1. A method for charging a battery, wherein the battery includes an enclosure, comprising the steps of:
   (a) providing an approximately constant current to the battery;
   (b) performing successive sampling operations of a first characteristic of the battery;
   (c) in response to the successive sampling operations, determining a one or more parameters of the battery;
   (d) comparing the value of the one or more parameters with a first predetermined value;
   (e) modifying the value of the approximately constant current supplied to the battery in response to a difference between the value of the one or more parameters and a first predetermined value; and
   (f) repeating the method from step (a) until the value of the first characteristic of the battery is determined to be equal to or greater than a second predetermined value.

2. The method according to claim 1, wherein the first characteristic of the battery is a value of voltage across the battery.

3. The method according to claim 2, wherein the voltage value is an open circuit voltage value.

4. The method according to claim 1, wherein the first characteristic of the battery is a value of temperature of the battery enclosure.

5. The method according to claim 1, wherein the first characteristic of the battery is a value of pressure within the battery enclosure.

6. The method according to claim 1, wherein the one or more parameters include a rate of change of the value of the first characteristic with respect to time.

7. The method according to claim 1, wherein the one or more parameters include a rate of change with respect to time of the rate of change of the value of the first characteristic with respect to time.

8. The method according to claim 1, further comprising the steps of:
   (g) providing an approximately constant voltage to the battery;
   (h) performing successive sampling operations of a second characteristic of the battery;
   (i) repeating the method from step (g) until the value of the second characteristic of the battery is determined to be less than or equal to a third predetermined value.

9. The method according to claim 8, wherein the second characteristic of the battery is a value of current through the battery.

10. The method according to claim 8, further comprising an additional step prior to step (g), said additional step comprising storing the instant value of the approximately constant current provided to the battery.

11. The method according to claim 10, further comprising the step of setting the value of the third predetermined value to a value that is a percentage of the stored instant value of the approximately constant current provided to the battery.

12. The method according to claim 11, wherein the percentage is ten percent.

13. A method for detecting possible failure of a battery being charged, wherein the battery includes an enclosure, comprising the steps of:
   (a) performing successive sampling operations of a characteristic of the battery;
   (b) in response to the successive sampling operations, determining a parameter of the battery;
   (c) repeating the method from step (a) unless the value of the parameter violates a rule; and
   (d) in response to the value of the parameter violating the rule, taking a corrective action.

14. The method according to claim 13, wherein approximately constant current is provided to said battery, and wherein the characteristic of the battery is a value of voltage across the battery, and the parameter is a change in the value of voltage, and the rule is that the change in voltage cannot be negative.

15. The method according to claim 13, wherein approximately constant current is provided to said battery, and wherein the characteristic of the battery is a value of voltage across the battery, and the parameter is the rate of change in the value of voltage with respect to time, and the rule is that the rate of change in the value of voltage cannot be negative.

16. The method according to claim 13, wherein approximately constant voltage is provided to said battery, and wherein the characteristic of the battery is a value of current through the battery, and the parameter is a change in the value of said current, and the rule is that the value of said change cannot be positive.

17. The method according to claim 13, wherein the taking corrective action comprises stopping the charging operation of the battery.

18. The method according to claim 13, wherein the taking corrective action comprises activating a means for connecting a positive and a negative terminal of the battery.

19. The method according to claim 18, wherein said means for connecting comprises a transistor.

* * * * *